US009686047B2

(12) United States Patent
Suzuki et al.

(10) Patent No.: US 9,686,047 B2
(45) Date of Patent: Jun. 20, 2017

(54) WIRELESS COMMUNICATION METHOD, MOBILE STATION APPARATUS, WIRELESS COMMUNICATION SYSTEM AND INTEGRATED CIRCUIT

(75) Inventors: Shoichi Suzuki, Osaka (JP); Daiichiro Nakashima, Osaka (JP); Katsunari Uemura, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 0 days.

(21) Appl. No.: 13/635,752

(22) PCT Filed: Mar. 25, 2011

(86) PCT No.: PCT/JP2011/057455
§ 371 (c)(1),
(2), (4) Date: Nov. 14, 2012

(87) PCT Pub. No.: WO2011/122495
PCT Pub. Date: Oct. 6, 2011

(65) Prior Publication Data
US 2013/0051341 A1 Feb. 28, 2013

(30) Foreign Application Priority Data
Mar. 30, 2010 (JP) ................................. 2010-077447

(51) Int. Cl.
*H04W 4/00* (2009.01)
*H04L 1/18* (2006.01)
(Continued)

(52) U.S. Cl.
CPC ............ *H04L 1/1835* (2013.01); *H04L 5/001* (2013.01); *H04L 5/0005* (2013.01); *H04W 72/042* (2013.01)

(58) Field of Classification Search
CPC .......... H04L 5/00; H04W 72/04; H04W 76/06
(Continued)

(56) References Cited

U.S. PATENT DOCUMENTS 8,239,721 B2   8/2012  Pelletier et al.
8,274,936 B2*  9/2012  Yoo ....................... H04L 5/0078
                                                          370/329
(Continued)

FOREIGN PATENT DOCUMENTS

EP    2 391 046 A2      11/2011
EP    2388944 A1 *      11/2011
(Continued)

OTHER PUBLICATIONS

International Search Report for PCT/JP2011/057455 dated Apr. 19, 2011.
(Continued)

*Primary Examiner* — Khaled Kassim
*Assistant Examiner* — Berhanu Belete
(74) *Attorney, Agent, or Firm* — Birch, Stewart, Kolasch & Birch, LLP

(57) ABSTRACT

To perform control of PUSCH retransmission efficiently in a wireless communication system where a mobile station apparatus and a base station apparatus communicate with each other using a plurality of downlink component carriers. In a mobile station apparatus which communicates with a base station apparatus using a plurality of downlink component carriers and a plurality of uplink component carriers, in case that the downlink component carrier corresponding to the uplink component carrier is set not to be used for downlink communication, the mobile station apparatus flushes HARQ buffers of the uplink component carrier associated with the downlink component carrier set not to be used for downlink communication.

9 Claims, 9 Drawing Sheets

(51) Int. Cl.
*H04L 5/00* (2006.01)
*H04W 72/04* (2009.01)

(58) Field of Classification Search
USPC ........ 370/345, 351–352, 252–254, 343, 348,
370/328–338; 714/748–749; 455/67.11,
455/452.1, 454, 455, 502, 507
See application file for complete search history.

(56) References Cited

U.S. PATENT DOCUMENTS

| | | | | |
|---|---|---|---|---|
| 8,274,969 | B2* | 9/2012 | Wu | H04W 74/008 370/348 |
| 8,386,874 | B2 | 2/2013 | Pelletier et al. | |
| 8,386,875 | B2* | 2/2013 | Earnshaw | H04L 1/1812 714/751 |
| 8,855,132 | B2* | 10/2014 | Lohr et al. | 370/431 |
| 8,946,697 | B1* | 2/2015 | Ma et al. | 257/40 |
| 8,976,668 | B2* | 3/2015 | Yang et al. | 370/236 |
| 2007/0097937 | A1* | 5/2007 | Kubota et al. | 370/338 |
| 2009/0086657 | A1* | 4/2009 | Alpert | H04L 1/1838 370/310 |
| 2009/0245203 | A1* | 10/2009 | Pani | H04W 36/30 370/331 |
| 2009/0257387 | A1 | 10/2009 | Gholmieh et al. | |
| 2009/0279495 | A1* | 11/2009 | Yoo | 370/329 |
| 2009/0296643 | A1* | 12/2009 | Cave | H04W 52/0216 370/329 |
| 2009/0300456 | A1 | 12/2009 | Pelletier et al. | |
| 2010/0008278 | A1* | 1/2010 | Kone | H04W 52/0216 370/311 |
| 2010/0058135 | A1* | 3/2010 | Tseng | H04L 1/1887 714/748 |
| 2010/0111067 | A1* | 5/2010 | Wu | H04W 74/008 370/345 |
| 2010/0118723 | A1* | 5/2010 | Pani | H04L 1/1812 370/252 |
| 2010/0130137 | A1* | 5/2010 | Pelletier | H04W 72/04 455/68 |
| 2010/0130219 | A1* | 5/2010 | Cave | H04W 72/02 455/450 |
| 2010/0254329 | A1* | 10/2010 | Pan | H04L 5/001 370/329 |
| 2010/0302964 | A1* | 12/2010 | Guo | H04L 5/0007 370/252 |
| 2011/0002281 | A1* | 1/2011 | Terry | H04W 52/0216 370/329 |
| 2011/0003555 | A1* | 1/2011 | Guo | H04L 5/001 455/67.11 |
| 2011/0021154 | A1* | 1/2011 | Mariner | H04W 72/02 455/67.11 |
| 2011/0053625 | A1 | 3/2011 | Ishii et al. | |
| 2011/0134774 | A1* | 6/2011 | Pelletier | H04W 52/365 370/252 |
| 2011/0243048 | A1* | 10/2011 | Wang | H04L 5/0051 370/311 |
| 2011/0274057 | A1* | 11/2011 | Kuo | 370/329 |
| 2011/0292887 | A1* | 12/2011 | Baldemair | H04L 5/0053 370/329 |
| 2011/0305290 | A1* | 12/2011 | Kim | H04L 5/0007 375/267 |
| 2012/0008600 | A1* | 1/2012 | Mariner | H04L 5/001 370/336 |
| 2012/0182986 | A1* | 7/2012 | Sebire | H04W 56/00 370/343 |
| 2012/0300733 | A1 | 11/2012 | Pelletier et al. | |
| 2013/0010619 | A1* | 1/2013 | Fong | H04W 74/002 370/252 |
| 2013/0010720 | A1* | 1/2013 | Lohr et al. | 370/329 |
| 2013/0016676 | A1* | 1/2013 | Lohr et al. | 370/329 |
| 2013/0039202 | A1* | 2/2013 | Feuersanger | H04L 5/001 370/252 |
| 2013/0170457 | A1 | 7/2013 | Pelletier et al. | |

FOREIGN PATENT DOCUMENTS

| | | |
|---|---|---|
| JP | 2009-232132 A | 10/2009 |
| WO | WO 2009/132203 A1 | 10/2009 |
| WO | WO 2011161538 A2 * | 12/2011 |

OTHER PUBLICATIONS

Panasonic, "Open issues on component carrier activation and deactivation", 3GPP TSG-RAN WG2 Meeting #69, Feb. 22-26, 2010, R2-101082, 4 pages.

Samsung, "Component carrier activation and deactivation", 3GPP TSG RAN WG1 Meeting #60, Feb. 22-26, 2010, R1-101144, 5 pages.

Ericsson, ST-Ericsson, "Further Details of Activation/Deactivation", Tdoc R2-101179, 3GPP TSG-RAN WG2 #69, San Francisco, USA, Feb. 22-26, 2010.

Nokia Corporation, Nokia Siemens Networks, "UL HARQ and Measurement Gaps", 3GPP TSG-RAN2 Meeting #63bis, Prague, Czech Republic, Sep. 29-Oct. 3, 2008, R2-084996.

Nokia Siemens Networks, "Report of the email discussion on Uplink HARQ Operation and Measurement Gaps", R2-086078, 3GPP TSG-RAN WG2 Meeting #64, Prague, Czech Republic, Nov. 10-14, 2008.

Samsung, "Discussion on special cell change", 3GPP TSG-RAN2#69 meeting, Tdoc R2-101504, San Francisco, U.S., Feb. 22-26, 2010, pp. 1-3.

Samsung, "Reusing REL-8 handover procedure for special cell change", 3GPP TSG-RAN2#68bis meeting, Tdoc R2 100489, Valencia, Spain, Jan. 18-22, 2010, pp. 1-3.

Samsung, "Correction to MAC-ehs reset at Treset expiry", 3GPP TSG-RAN2 Meeting #69, San Francisco, USA, Feb. 22-26, 2010, R2-101066, 3 pages.

Alcatel-Lucent, Asustek, CATT, Ericsson, Fujitsu, Huawei, LG Electronics Inc., Nokia Corporation, Nokia Siemens Networks, NTT Docomo Inc., Panasonic, Qualcomm Europe, Sunplus Mmobile Inc. : "UL HARQ and Measurement Gaps", 3GPP TSG-RAN2 Meeting #64, R2-086079, Oct. 10-14, 2008, XP050321143, Prague, Czech Republic.

* cited by examiner

WIRELESS COMMUNICATION METHOD, MOBILE STATION APPARATUS, WIRELESS COMMUNICATION SYSTEM AND INTEGRATED CIRCUIT

TECHNICAL FIELD

The present invention relates to a wireless communication method, a mobile station apparatus, a wireless communication system and an integrated circuit.

BACKGROUND ART

Evolution of a radio access method and a radio network of a cellular mobile communication (hereinafter, referred to as "Long Term Evolution (LTE)" or "Evolved Universal Terrestrial Radio Access (EUTRA)") has been investigated in the third generation partnership project (3rd Generation Partnership Project: 3GPP). In the LTE, as a communication system of a wireless communication (downlink) from a base station apparatus to a mobile station apparatus, used is an orthogonal frequency division multiplexing (Orthogonal Frequency Division Multiplexing: OFDM) system that is multi-carrier transmission. As a communication system of a wireless communication (uplink) from a mobile station apparatus to a base station apparatus, used is an SC-FDMA (Single-Carrier Frequency Division Multiple Access) system that is single-carrier transmission.

In the LTE, a base station apparatus, using downlink control information (DCI) transmitted by a PDCCH (Physical Downlink Control Channel), instructs a mobile station apparatus to perform initial transmission or retransmission of a PUSCH (Physical Uplink Shared Channel) that is a channel for uplink data (Transport block) transmission. The base station apparatus receives a PUSCH which the mobile station apparatus transmits, and transmits, by a PHICH (Physical HARQ Indicator Channel), a HARQ (Hybrid Automatic Repeat reQuest) indicator indicating a decoding result of the PUSCH.

A HARQ indicator indicates ACK or NACK. When the base station apparatus succeeds in decoding a PUSCH, the HARQ indicator indicates ACK (ACKnowledgement), and when the base station apparatus fails in decoding the PUSCH, the HARQ indicator indicates NACK (Negative ACKnowledgement).

The mobile station apparatus, first, performs detection of a signal by a PHICH. The mobile station apparatus, when detecting a signal by the PHICH, sets a HARQ feedback to ACK or NACK which a HARQ indicator received by the PHICH indicates. The mobile station apparatus, when detecting no signal by the PHICH, sets a HARQ feedback to nothing (a state of the HARQ feedback is maintained).

Then, the mobile station apparatus performs detection of downlink control information. The mobile station apparatus, when having received the downlink control information instructing initial transmission of a PUSCH, determines uplink data transmitted by a PUSCH, stores this uplink data in a HARQ buffer, performs initial transmission of a PUSCH in accordance with the downlink control information, and sets a HARQ feedback to NACK. The mobile station apparatus, when having received the downlink control information instructing retransmission of a PUSCH, performs, by a PUSCH, retransmission of uplink data stored in a HARQ buffer in accordance with the downlink control information, and sets a HARQ feedback to NACK. Note that the mobile station apparatus, when having detected the downlink control information instructing initial transmission or retransmission of a PUSCH, does not perform an operation based on a HARQ indicator (that is, ACK or NACK set to HARQ feedback) received by a PHICH.

The mobile station apparatus, when having not received the downlink control information for a PUSCH, performs transmission of a PUSCH based on a HARQ feedback which has been set. The mobile station apparatus, when NACK is set to a HARQ feedback, performs retransmission of a PUSCH, and when ACK is set to a HARQ feedback, does not perform transmission of a PUSCH, and keeps data stored in a HARQ buffer. The mobile station apparatus, when NACK is set to a HARQ feedback, until receiving, by a PHICH, a HARQ indicator which indicates ACK, or until receiving, by PDCCH, newly the downlink control information for a PUSCH, performs retransmission of a PUSCH based on the downlink control information received last. For example, the mobile station apparatus, when having detected no signal by a PHICH in a state where NACK is set to a HARQ feedback, performs retransmission of a PUSCH.

In 3GPP, a radio access system and a radio network which realize higher-speed data communication using a frequency band wider than the LTE (hereinafter, referred to as "Long Term Evolution-Advanced" (LTE-A) or "Advanced Evolved Universal Terrestrial Radio Access" (A-EUTRA)) has been investigated. In the LTE-A, it is requested to have backward compatibility with the LTE, that is, it is requested that a base station apparatus of the LTE-A performs wireless communication with mobile station apparatuses of both LTE-A and LTE simultaneously, and that a mobile station apparatus of the LTE-A is made to be able to perform wireless communication with base station apparatuses of both LTE-A and LTE, and it has been investigated that the LTE-A uses the same channel structure as the LTE.

In the LTE-A, a technology (frequency band aggregation; referred to also as Spectrum aggregation, Carrier aggregation, Frequency aggregation or the like.) has been investigated in which frequency bands of the same channel structure as the LTE (hereinafter, referred to as "component carrier (CC)") are aggregated, and used as one frequency band (wide frequency band). Specifically, in a communication using frequency aggregation, a downlink channel is transmitted for every downlink component carrier, and an uplink channel is transmitted for every uplink component carrier. That is, the frequency aggregation is a technology by which a base station apparatus and a plurality of mobile station apparatuses transmit and receive a plurality of pieces of data and a plurality of pieces of control information simultaneously using a plurality of channels, a plurality of component carriers in an uplink and a downlink.

In a communication using the frequency aggregation, it has been proposed that a base station apparatus sets a downlink component carrier and an uplink component carrier which are used for communication to a mobile station apparatus using an RRC signal (Radio Resource Control signal) or the like, and notifies, using a PDCCH or a MAC (Medium Access Control) CE (Control Element) or the like, of an activation command which indicates a downlink component carrier used for downlink communication from among the set downlink component carriers. (Non-patent document 1)

PRIOR ART DOCUMENT

Non-Patent Document

Non-patent document 1: "Open issues on component carrier activation and deactivation", 3GPP TSG RAN WG2 Meeting #69, R2-101082, Feb. 22-26, 2010.

DISCLOSURE OF THE INVENTION

Summary of the Invention

Problems to be Solved by the Invention

However, in a prior art, in a mobile station apparatus, if a downlink component carrier for a PUSCH is excluded from downlink component carriers used for downlink communication in a state where HACK is set to a HARQ feedback associated with the PUSCH transmitted by an uplink, there was a problem that the mobile station apparatus, in spite of a decoding result of the PUSCH in the base station apparatus, has repeated retransmission of the PUSCH.

The present invention is accomplished in view of the above-mentioned point, and the object is to provide a wireless communication method, a mobile station apparatus, a wireless communication system and an integrated circuit capable of performing control of retransmission of a PUSCH efficiently in a wireless communication system where a mobile station apparatus and a base station apparatus communicate with each other using a plurality of downlink component carriers.

Means for Solving the Problem (1) In order to achieve above-mentioned objects, an embodiment of the present invention has taken the following measures. That is, a wireless communication method of an embodiment of the present invention is the wireless communication method used for a mobile station apparatus which communicates with a base station apparatus using a plurality of downlink component carriers and a plurality of uplink component carriers, in case that the downlink component carrier corresponding to the uplink component carrier is set not to be used for downlink communication, the method comprising a step of flushing a HARQ buffer of the uplink component carrier associated with the downlink component carrier set not to be used for downlink communication.

(2) A mobile station apparatus of an embodiment of the present invention is the mobile station apparatus which communicates with a base station apparatus using a plurality of downlink component carriers and a plurality of uplink component carriers, wherein in case that the downlink component carrier corresponding to the uplink component carrier is set not to be used for downlink communication, the mobile station apparatus flushes HARQ buffers of the uplink component carrier associated with the downlink component carrier set not to be used for downlink communication.

(3) A wireless communication system of an embodiment of the present invention is the wireless communication system where a mobile station apparatus and a base station apparatus communicate with each other using a plurality of downlink component carriers and a plurality of uplink component carriers, wherein the mobile station apparatus, in case that the downlink component carrier corresponding to the uplink component carrier is set not to be used for downlink communication, flushes HARQ buffers of an uplink component carrier associated with the downlink component carrier set not to be used for downlink communication, and the base station apparatus judges that, the mobile station apparatus, in case that having set the downlink component carrier corresponding to the uplink component carrier not to be used for downlink communication, has flushed HARQ buffers of the uplink component carrier associated with the downlink component carrier set not to be used for downlink communication.

(4) An integrated circuit of an embodiment of the present invention is the integrated circuit used for a mobile station apparatus which communicates with a base station apparatus using a plurality of downlink component carriers and a plurality of uplink component carriers, wherein in case that the downlink component carrier corresponding to the uplink component carrier is set not to be used for downlink communication, the integrated circuit includes a function to flush HARQ buffers of the uplink component carrier associated with the downlink component carrier set not to be used for downlink communication.

(5) A wireless communication method of an embodiment of the present invention is the wireless communication method used for a mobile station apparatus which communicates with a base station apparatus using a plurality of downlink component carriers and a plurality of uplink component carriers, in case that the downlink component carrier corresponding to the uplink component carrier is deactivated, the method comprising a step of flushing HARQ buffers of the uplink component carrier associated with the deactivated downlink component carrier.

(6) The wireless communication method of an embodiment of the present invention further comprises a step of deactivating a downlink component carrier in case that notified by a command transmitted from the base station apparatus.

(7) The wireless communication method of an embodiment of the present invention, in case that a prescribed time has elapsed after activating a downlink component carrier based on a notification by a command transmitted from said base station apparatus, further comprises a step of deactivating the activated downlink component carrier.

(8) The wireless communication method of an embodiment of the present invention, in case that a prescribed time has elapsed after a physical downlink control channel transmitted from the base station apparatus was received by a downlink component carrier, further comprises a step of deactivating the downlink component carrier which received the physical downlink control channel.

(9) A mobile station apparatus of an embodiment of the present invention is the mobile station apparatus which communicates with a base station apparatus using a plurality of downlink component carriers and a plurality of uplink component carriers, wherein in case that the downlink component carrier corresponding to the uplink component carrier is deactivated, the mobile station apparatus flushes HARQ buffers of the uplink component carrier associated with the deactivated downlink component carrier.

(10) A wireless communication system of an embodiment of the present invention is the wireless communication system where a mobile station apparatus and a base station apparatus communicate with each other using a plurality of downlink component carriers and a plurality of uplink component carriers, wherein the mobile station apparatus, in case that having deactivated the downlink component carrier corresponding to the uplink component carrier, flushes HARQ buffers of the uplink component carrier associated with the deactivated downlink component carrier, and the base station apparatus judges that the mobile station apparatus, in case that having deactivated the downlink component carrier corresponding the uplink component carrier, has flushed HARQ buffers of the uplink component carrier associated with the deactivated downlink component carrier.

(11) An integrated circuit of an embodiment of the present invention is the integrated circuit used for a mobile station apparatus which communicates with a base station apparatus using a plurality of downlink component carriers and a plurality of uplink component carriers, wherein in case that the downlink component carrier corresponding to the uplink component carrier is deactivated, the integrated circuit includes a function to flush HARQ buffers of the uplink component carrier associated with the deactivated downlink component carrier.

(12) A wireless communication method of an embodiment of the present invention is the wireless communication method used for a mobile station apparatus which communicates with a base station apparatus using a plurality of downlink component carriers, in case that a downlink component carrier on which the mobile station apparatus is to receive a HARQ indicator corresponding to uplink data transmitted to the base station apparatus is deactivated, the method comprising a step of setting ACK without receiving the HARQ indicator.

(13) A mobile station apparatus of an embodiment of the present invention is the mobile station apparatus which communicates with a base station apparatus using a plurality of downlink component carriers, wherein in case that a downlink component carrier on which the mobile station apparatus is to receive a HARQ indicator corresponding to uplink data transmitted to the base station apparatus is deactivated, the mobile station apparatus sets ACK without receiving the HARQ indicator.

(14) A wireless communication system of an embodiment of the present invention is the wireless communication system where a mobile station apparatus and a base station apparatus communicate with each other using a plurality of downlink component carriers, wherein in case that a downlink component carrier on which the mobile station apparatus is to receive a HARQ indicator corresponding to uplink data which the mobile station apparatus transmitted to the base station apparatus is deactivated, the mobile station apparatus sets ACK without receiving the HARQ indicator, and the base station apparatus judges that the mobile station apparatus has set ACK without receiving the HARQ indicator.

(15) An integrated circuit of an embodiment of the present invention is the integrated circuit used for a mobile station apparatus which communicates with a base station apparatus using a plurality of downlink component carriers, wherein in case that a downlink component carrier on which the mobile station apparatus is to receive a HARQ indicator corresponding to uplink data transmitted to the base station apparatus is deactivated, the integrated circuit includes a function for setting ACK without receiving the HARQ indicator.

Effect of the Invention

According to an embodiment of the present invention, in a wireless communication system where a mobile station apparatus and a base station apparatus communicate with each other using a plurality of downlink component carriers, a mobile station apparatus can control retransmission of a PUSCH efficiently.

BEST MODES FOR CARRYING OUT THE INVENTION

First Embodiment

Hereinafter, a first embodiment of the present invention will be described in detail, referring to drawings.

Figure 1:
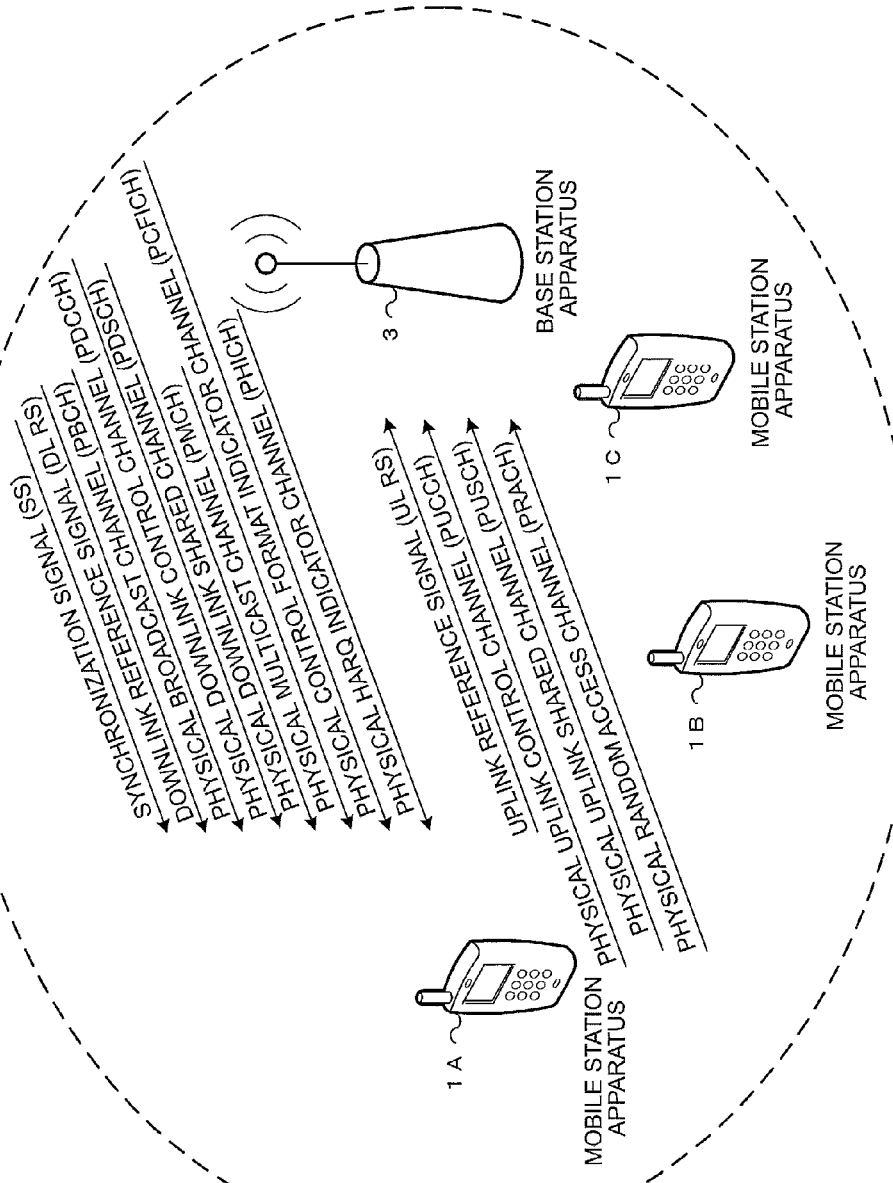
FIG. 1 is a conceptual diagram of a wireless communication system according to a first embodiment of the present invention.

FIG. 1 is a conceptual diagram of a wireless communication system according to the first embodiment of the present invention. In FIG. 1, the wireless communication system includes mobile station apparatuses 1A to 1C and a base station apparatus 3. FIG. 1 shows that in a wireless communication (downlink) from the base station apparatus 3 to the mobile station apparatuses 1A to 1C, allocated are: a synchronization signal (SS); a downlink reference signal (DL RS); a physical broadcast channel (PBCH); a physical downlink control channel (PDCCH); a physical downlink shared channel (PDCCH); a physical multicast channel (PMCH); a physical control format indicator channel (PCFICH); and a physical HARQ indicator channel (PHICH).

FIG. 1 also shows that in a wireless communication (uplink) from the mobile station apparatuses 1A to 1C to the base station apparatus 3, allocated are an uplink reference signal (UL RS), a physical uplink control channel (PUCCH), a physical uplink shared channel (PUSCH), and a physical random access channel (PRACH). Hereinafter, the mobile station apparatuses 1A to 1C are referred to as a mobile station apparatus 1.

Figure 2:
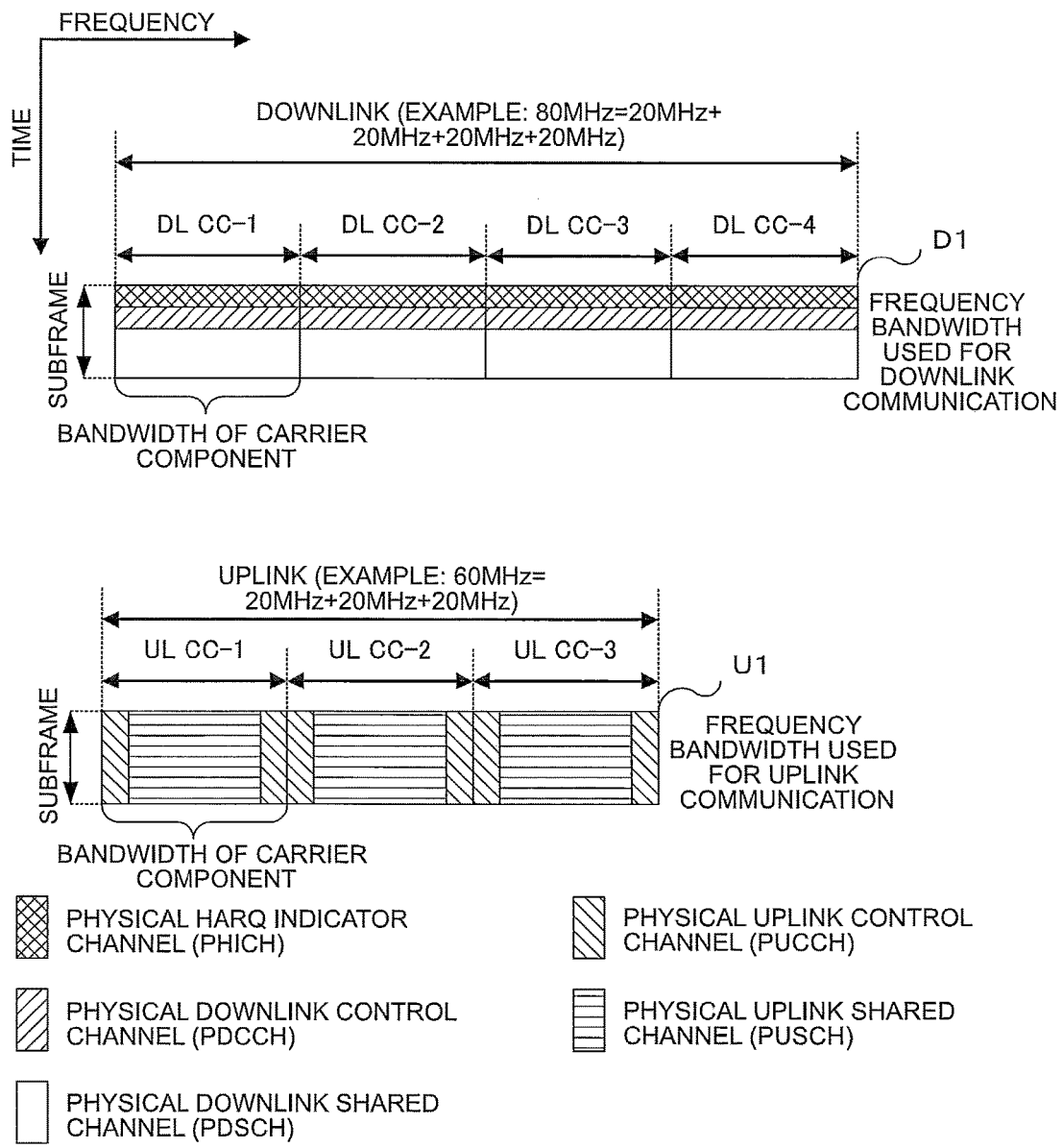
FIG. 2 is a figure showing an example of a frequency aggregation processing of an embodiment of the present invention.

FIG. 2 is a figure showing an example of a frequency aggregation processing of an embodiment of the present invention. In FIG. 2, a horizontal axis represents a frequency domain and a vertical axis represents a time domain. As shown in FIG. 2, a downlink subframe D1 is constituted by the subframes of four downlink component carriers (DL CC-1; Downlink Component Carrier-1, DL CC-2, DL CC-3, DL CC-4) each having a bandwidth of 20 MHz. In each of subframes of the downlink component carriers, there exist a region where a PHICH indicated by a region hatched with mesh-like lines is assigned, a region where a PDCCH indicated by a region hatched with a slash upward slanting to the right is assigned, and a region where a PDSCH indicated by a region non-hatched is assigned. In a region where a PHICH is assigned and a region where a PDCCH is assigned, frequency multiplexing and/or time multiplexing are carried out. A region where a PHICH and a PDCCH are frequency-multiplexed and/or time-multiplexed is time-multiplexed with a region where a PDSCH is assigned.

On the other hand, an uplink subframe U1 is constituted by three uplink component carriers (UL CC-1; Uplink Component Carrier-1, UL CC-2, UL CC-3) each having a bandwidth of 20 MHz. For each of subframes of the uplink component carriers, a region where a PUCCH indicated by a region hatched with a slash of a right going down is assigned is frequency-multiplexed with a region where a PUSCH indicated by a region hatched by a horizontal line is assigned.

First, the mobile station apparatus 1 performs initial access to the base station apparatus 3 using any one pair of a downlink component carrier and an uplink component carrier. The base station apparatus 3 notifies the mobile station apparatus 1 of a set downlink component carrier and uplink component carrier (hereinafter, referred to as "configured component carrier") by an RRC signal (Radio Resource Control signal) which the base station apparatus 3 transmits using a PDSCH of the downlink component carrier in which the mobile station apparatus 1 has performed the initial access.

The base station apparatus 3 notifies of an activation command which indicates the downlink component carrier used for downlink communication from among configured downlink component carriers, using a PDCCH or a MAC (Medium Access Control) CE (Control Element) or the like. For example, the activation command is constituted with a bit map, and when a value of a bit corresponding to each downlink component carrier is "1", it indicates to use the downlink component carrier for downlink communication, and when the value of the bit is "0", it indicates not to use the downlink component carrier for downlink communication. An activation command applies after a prescribed time after the activation command is received (for example, after 1 subframe, 4 subframes or the like). In addition, a MAC CE is transmitted using a PDSCH.

It is referred to as activating a downlink component carrier that the base station apparatus 3 notifies the mobile station apparatus 1 by an activation command to use the downlink component carrier for downlink communication. It is referred to as deactivating a downlink component carrier that the base station apparatus 3 notifies the mobile station apparatus 1 by an activation command not to use the downlink component carrier for downlink communication.

A downlink component carrier which has been activated is referred to as an activated downlink component carrier or a configured and activated downlink component carrier, and an downlink component carrier which has been deactivated is referred to as an deactivated downlink component carrier or a configured and deactivated downlink component carrier.

The mobile station apparatus 1 may deactivate the downlink component carrier by a method different from a method for deactivating the downlink component carrier which is notified, by an activation command, that it is not used for downlink communication. For example, the mobile station apparatus 1 may deactivate the downlink component carrier in case that a prescribed time has elapsed after the downlink component carrier is activated by the activation command, and may deactivate the downlink component carrier in case that a prescribed time has elapsed after receiving a PDCCH or a PDSCH last by the activated downlink component carrier. That is, the mobile station apparatus 1 may deactivate the downlink component carrier by self-judgment. Note that the base station apparatus 3 may set an above-mentioned prescribed time, and may notify the mobile station apparatus 1 of information including this setting by the RRC signal.

The mobile station apparatus 1 does not receive signals of the deactivated downlink component carrier. The base station apparatus 3 judges that signals of the deactivated downlink component carrier are not received by the mobile station apparatus 1. For example, the base station apparatus 3, in a downlink subframe, allocates signals (a PDSCH, a PDCCH, a PHICH, or the like) in one or more downlink component carriers among activated downlink component carriers, and transmits them to the mobile station apparatus 1. The mobile station apparatus 1 performs monitoring and reception processing of only signals (a PDSCH, a PDCCH, a PHICH, or the like) of the activated downlink component carriers.

The base station apparatus 3 configures a downlink primary component carrier (DL PCC) and an uplink primary component carrier (UL PCC) for every mobile station apparatus 1 from among the configured downlink component carriers and uplink component carriers, and notifies the mobile station apparatus 1 of an RRC signal including information on this configuration. The mobile station apparatus 1, until the downlink primary component carrier and the uplink primary component carrier are configured, configures the downlink component carrier and uplink component carrier used for the initial access as the downlink primary component carrier and uplink primary component carrier.

The base station apparatus 3 cannot deactivate a downlink primary component carrier, that is, a downlink primary component carrier is always activated. An uplink primary component carrier is used for transmitting uplink control information.

The base station apparatus 3, in an uplink subframe, carries out allocation of radio resources of a PUSCH of one or more uplink component carriers among configured uplink component carriers, and transmits downlink control information (DCI) which indicates the allocation of radio resources for this PUSCH by a PDCCH of the activated downlink component carrier. The mobile station apparatus 1 allocates signals in a PUSCH of one or more uplink component carriers among configured uplink component carriers in accordance with the downlink control information which indicates an allocation of radio resources of a PUSCH, and transmits them to the base station apparatus 3.

In a downlink subframe, the downlink control information for a PDSCH of a downlink component carrier and a PUSCH of an uplink component carrier is transmitted to the mobile station apparatus 1 using a PDCCH of any one of downlink component carriers among configured and activated downlink component carriers. A PDCCH for a PDSCH of a downlink component carrier, and a PDCCH for a PUSCH of an uplink component carrier may be assigned in a downlink component carrier different for every subframe.

That is, for one PDSCH of a downlink component carrier, or for one PUSCH of an uplink component carrier, a plurality of PDCCHs is not transmitted simultaneously even by one downlink component carrier, or even by a plurality of downlink component carriers. For example, in FIG. 2, in a downlink subframe, a PDCCH for a PUSCH of a ULCC-1 is transmitted by a PDCCH of one downlink component carrier (DL CC-1, DL CC-2, DL CC-3, or DL CC-4) among a DL CC-1 to a DL CC-4.

Note that downlink component carriers in which a PDCCH for a PDSCH of a downlink component carrier or a PUSCH of an uplink component carrier can be transmitted may be restricted. For example, in FIG. 2, the PDCCH for the PUSCH of the UL CC-1 may be restricted so as to be transmitted only by one downlink component carrier among the DL-CC1 and the DL-CC2 for every subframe. The PDCCH for the PUSCH of the ULCC-1 may be restricted so as to be transmitted only by the DL CC-1 for every subframe.

A HARQ (Hybrid Automatic Repeat reQuest) indicator which indicates a decoding result of a PUSCH transmitted by the mobile station apparatus 1 by an uplink component carrier is transmitted by the PHICH of the downlink component carrier by which the PDCCH for this PUSCH was transmitted last. For example, in FIG. 2, when the mobile station apparatus 1 receives last a PDCCH for a PUSCH of the UL CC-1 by the DL CC-1, and transmits the PUSCH by the UL CC-1, the HARQ indicator for this PUSCH is transmitted by the PHICH of the DL CC-1. When the base station apparatus 3 succeeds in decoding a PUSCH, a HARQ indicator indicates ACK (ACKnowledgement), and when the base station apparatus fails in decoding a PUSCH, a HARQ indicator indicates NACK (Negative ACKnowledgement).

Figure 3:
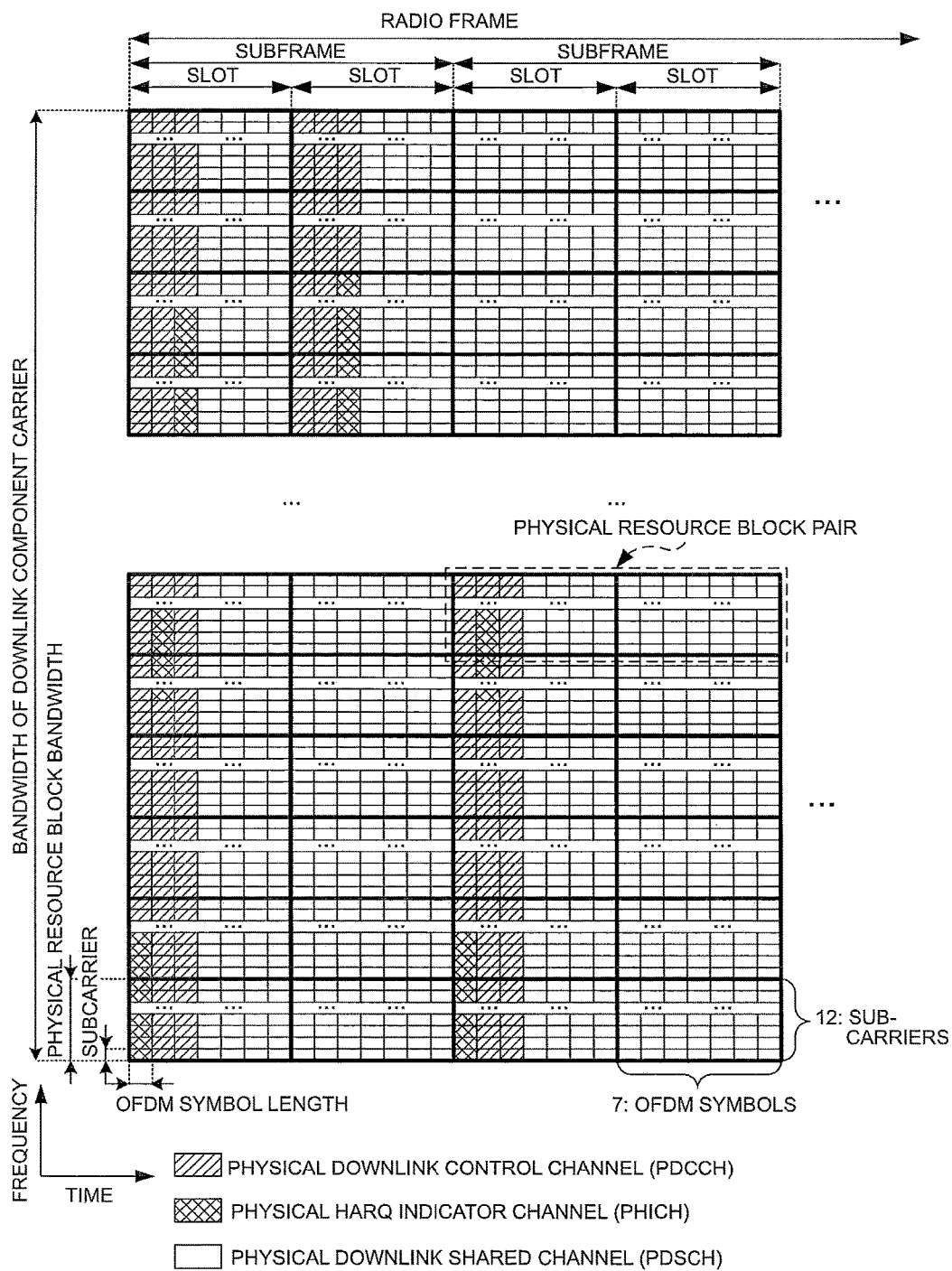
FIG. 3 is a schematic diagram showing an example of a configuration of a downlink radio frame of an embodiment of the present invention.

FIG. 3 is a schematic diagram showing an example of a configuration of a downlink radio frame of an embodiment of the present invention. FIG. 3 shows a configuration of a radio frame in a downlink component carrier. In FIG. 3, a horizontal axis is a time domain and a vertical axis is a frequency domain. As shown in FIG. 3, a radio frame of a downlink component carrier includes a plurality of downlink physical resource block (PRB) pairs (for example, region surrounded with a dashed line in FIG. 3). This downlink physical resource block pair is a unit of allocation or the like of radio resources, and includes a frequency band of a predetermined width (PRB bandwidth; 180 kHz) and a time slot (two slots=one subframe; 1 ms).

One downlink physical resource block pair includes two contiguous downlink physical resource blocks (PRB bandwidth×slot) in a time domain. One downlink physical resource block (in FIG. 3, unit surrounded by a thick line) includes 12 subcarriers (15 kHz) in a frequency domain, and includes seven OFDM (Orthogonal Frequency Division Multiplexing) symbols (71 µs) in a time domain.

In a time domain, there exist a slot (0.5 ms) including seven OFDM symbols (71 µs), a subframe including two slots (1 ms), and a radio frame (10 ms) including 10 subframes. "1 ms" which is the same time interval as a subframe is also referred to as a transmit time interval (TTI). In a frequency domain, a plurality of downlink physical resource blocks is arranged in accordance with a bandwidth of a downlink component carrier. A unit including one subcarrier and one OFDM symbol is referred to as a downlink resource element.

Hereinafter, a channel allocated in a downlink component carrier will be described. In each downlink subframe, for example, a PDCCH, a PHICH, a PDSCH, and a downlink reference signal are allocated. First, the PDCCH will be described. The PDCCH is assigned from an OFDM symbol at a head of a subframe (in FIG. 3, a region hatched with a slash upward slanting to the right). Note that the number of OFDM symbols in which the PDCCH is assigned is 1 to 3, and differs for every subframe. In the PDCCH, assigned is a signal of downlink control information which includes information formats such as a downlink assignment (also referred to as downlink grant) and an uplink grant and which is used for communication control. In each subframe, a plurality of the PDCCHs is frequency-multiplexed and time-multiplexed in each downlink component carrier.

The downlink assignment includes information on a modulation scheme and encoding for a PDSCH, information indicative of an allocation of radio resources, information on a HARQ indicative of initial transmission, retransmission or the like, a TPC command and the like. The uplink grant includes information on a modulation scheme and encoding for a PUSCH, information indicative of an allocation of radio resources, information on a HARQ indicative of initial transmission, retransmission or the like, a TPC command and the like. Note that the HARQ means a technology in which the mobile station apparatus 1 (base station apparatus 3), for example, transmits a HARQ feedback indicative of a decoding result of data to the base station apparatus 3 (mobile station apparatus 1), and when the mobile station apparatus 1 (base station apparatus 3) cannot decode data because of an error (NACK), the base station apparatus 3 (mobile station apparatus 1) retransmits the signal, and the mobile station apparatus 1 (base station apparatus 3) performs decoding processing for a synthesized signal of a signal received again and an already received signal.

In information on a HARQ constituting a downlink assignment and an uplink grant, an NDI (New Data Indicator) is included. The mobile station apparatus 1, when having received the downlink assignment or uplink grant, stores the NDI included in the received downlink assignment or uplink grant. Then, when the mobile station apparatus 1 has already stored a NDI, a new NDI is overwritten after judging whether the NDI has been toggled.

The mobile station apparatus 1, when the NDI has been toggled, judges that a downlink assignment or an uplink grant indicates initial transmission, and when the NDI has not been toggled, judges that a downlink assignment or an uplink grant indicates retransmission. The wording "NDI is toggled" means that the value of the NDI already stored is different from that of a received NDI, and the wording "NDI is not toggled" means that the value of the NDI already stored is the same as that of a received NDI. Hereinafter, that a NDI included in a downlink assignment or an uplink grant is toggled is referred to as that the downlink assignment or the uplink grant is instructing initial transmission, and that the NDI is not toggled is referred to as that the downlink assignment or the uplink grant instructs retransmission.

A coding method of downlink control information will be described. First, the base station apparatus 3 attaches, to the downlink control information, a sequence in which a cyclic redundancy check (CRC) code generated on the basis of downlink control information is scrambled by an RNTI (Radio Network Temporary Identifier). The mobile station apparatus 1 changes interpretation of the downlink control information depending on which RNTI the cyclic redundancy check code is scrambled by. For example, the mobile station apparatus 1, when the cyclic redundancy check code is scrambled by a C-RNTI (Cell-Radio Network Temporary Identity) allocated to the own apparatus from the base station apparatus 3, judges that the downlink control information indicates radio resources addressed to the own apparatus. Hereinafter, that a cyclic redundancy check code scrambled by an RNTI is attached to downlink control information is expressed simply that an RNTI is included in downlink control information, or an RNTI is included in a PDCCH.

The mobile station apparatus 1 carries out decode-processing of a PDCCH, and descrambles a sequence corresponding to a cyclic redundancy check code scrambled by an RNTI by the RNTI stored in the own apparatus, and judges that acquisition of a PDCCH is successful when having detected that there is no error based on the descrambled cyclic redundancy check code. This processing is referred to as blind decoding.

Next, a PHICH will be described. In each subframe, a PHICH and PDCCH are frequency-multiplexed in the same OFDM symbol (in FIG. 3, region hatched with mesh-like lines). A PHICH may be assigned only in an OFDM symbol at a head of a subframe, and may be assigned dispersedly in a plurality of OFDM symbols. In a PHICH, a HARQ indicator indicative of a decoding result of a PUSCH (ACK/NACK) is assigned. In addition, in each subframe, a plurality of PHICHs is frequency-multiplexed and code-multiplexed in each downlink component carrier.

A HARQ indicator indicative of a decoding result of a PUSCH transmitted by the mobile station apparatus 1 by an uplink component carrier is transmitted by a PHICH of the same downlink component carrier in which an uplink grant for this PUSCH was transmitted last. Which PHICH in a downlink component carrier a HARQ indicator for a PUSCH is assigned in is determined based on the number of a physical resource block of which the number is the smallest (of the lowest frequency domain) among physical resource blocks allocated to this PUSCH, and based on information on a cyclic shift of an uplink reference signal time-multiplexed with a PUSCH, the information being included in an uplink grant.

The mobile station apparatus 1 receives a HARQ feedback for the PUSCH by a PHICH of a downlink subframe after prescribed time after transmitting the PUSCH (for example, after 4 ms, after 4 subframes, and after 4 TTI). In an uplink reference signal, code multiplexing is used, and a plurality of different codes is used. For example, the plurality of different codes is generated by shifting periodically a basic sequence determined in advance (referred to as a cyclic shift), and a different code is generated by a cyclic shift of a different shift amount.

Next, a PDSCH will be described. A PDSCH is assigned in OFDM symbols other than OFDM symbols where a PDCCH and/or a PHICH of a subframe are assigned (in FIG. 3, region not hatched). In the PDSCH, a signal of downlink data (or referred to as "a transport block") is assigned. Radio resources of a PDSCH are allocated using a downlink assignment. Radio resources of a PDSCH, in a time domain, are assigned in a subframe of the same downlink as a PDCCH including a downlink assignment used for allocation of this PDSCH, and are assigned, in a frequency domain, in the same downlink component carrier as a PDCCH including a downlink assignment used for the allocation of this PDSCH, or in a different downlink component carrier.

In a downlink assignment, information (hereinafter, referred to as "downlink carrier indicator") which indicates PDSCH of a downlink component carrier corresponding to this downlink assignment is included. When a downlink carrier indicator is not included in a downlink assignment, a downlink assignment which does not include a downlink carrier indicator, and the PDSCH to which this downlink assignment corresponds are transmitted in the same downlink component carrier. In each subframe, a plurality of PDSCHs is frequency-multiplexed and spacial-multiplexed in each downlink component carrier. With respect to a downlink reference signal, although illustration is omitted in FIG. 3 for simplification of description, the downlink reference signal is assigned dispersedly in a frequency domain and in a time domain.

Figure 4:
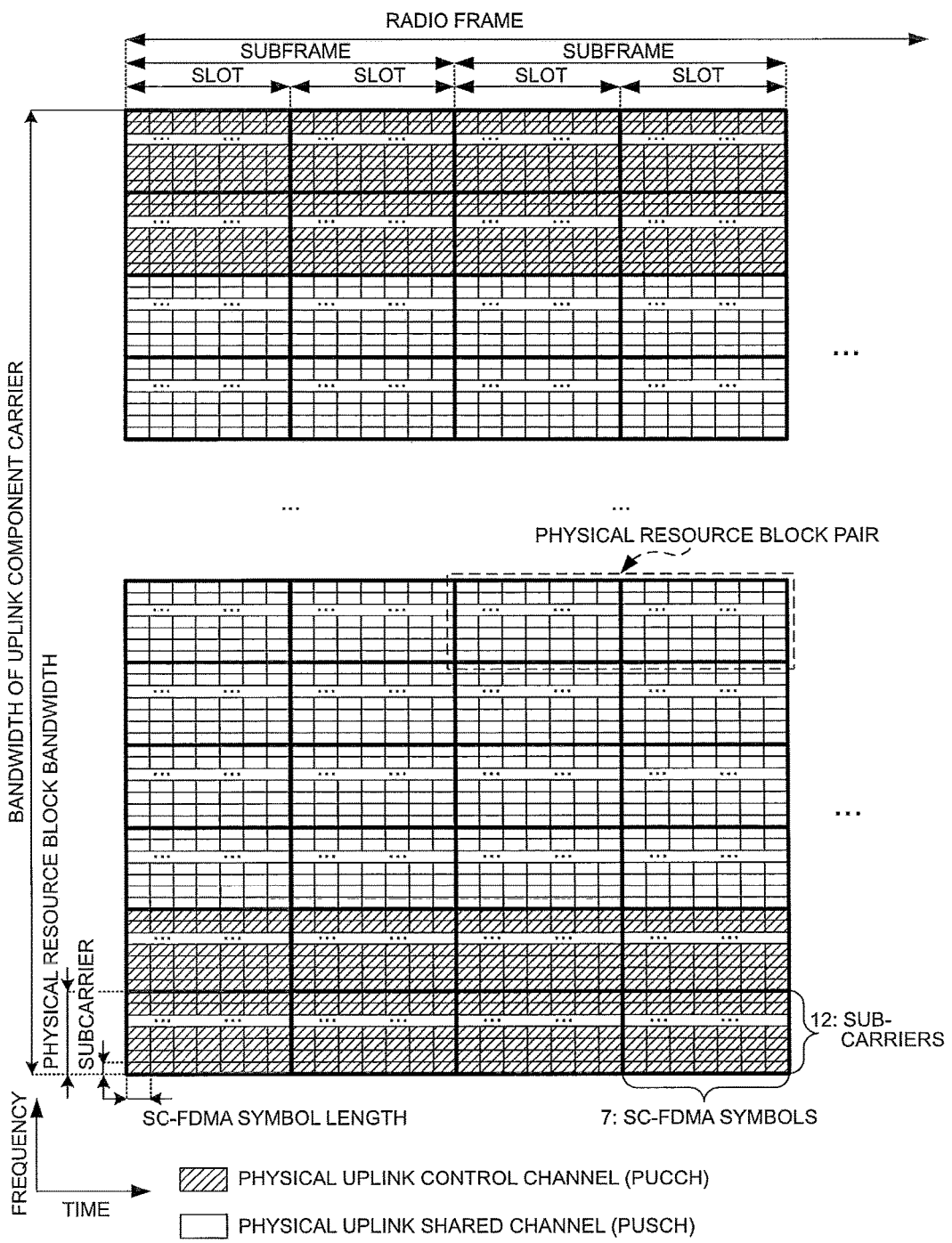
FIG. 4 is a schematic diagram showing an example of a configuration of an uplink radio frame of an embodiment of the present invention.

FIG. 4 is a schematic diagram showing an example of a configuration of an uplink radio frame of an embodiment of the present invention. FIG. 4 shows a configuration of a radio frame in an uplink component carrier. In FIG. 4, a horizontal axis is a time domain and a vertical axis is a frequency domain. As shown in FIG. 4, an uplink radio frame includes a plurality of uplink physical resource block pairs (for example, region surrounded with a dashed line of FIG. 4). This uplink physical resource block pair is a unit of an allocation or the like of radio resources, and includes a frequency band of a predetermined width (PRB bandwidth; 180 kHz) and a time slot (two slots=one subframe; 1 ms).

One uplink physical resource block pair includes two contiguous uplink physical resource blocks (PRB bandwidth×slot) in a time domain. One uplink physical resource block (in FIG. 4, unit surrounded by a thick line) includes 12 subcarriers (15 kHz) in a frequency domain, and includes seven SC-FDMA symbols (71 μs) in a time domain.

In a time domain, there exist a slot (0.5 ms) including seven SC-FDMA (Single-Carrier Frequency Division Multiple Access) symbols (71 μs), a subframe including two slots (1 ms), and a radio frame (10 ms) including 10 subframes. "1 ms" which is the same time interval as the subframe is also referred to as a transmit time interval (TTI). In a frequency domain, a plurality of uplink physical resource blocks is assigned in accordance with a bandwidth of an uplink component carrier. Note that a unit including one subcarrier and one SC-FDMA symbol is referred to as an uplink resource element.

Hereinafter, a channel allocated in an uplink radio frame will be described. In each uplink subframe, a PUCCH, a PUSCH, and an uplink reference signal are allocated, for example. First, a PUCCH will be described. A PUCCH is allocated to an uplink physical resource block pair (region hatched with a slash upward slanting to the right) at both ends of a band of an uplink component carrier. In the PUCCH, assigned are signals of uplink control information (UCI) which is the information used for communication control, such as channel quality information indicative of a downlink channel quality (Channel Quality Information), a scheduling request (SR) indicative of a request for an allocation of uplink radio resources, and ACK/NACK for a PDSCH. In each subframe, a plurality of PUCCHs is frequency-multiplexed and code-multiplexed in each uplink component carrier.

Next, a PUSCH will be described. A PUSCH is allocated to an uplink physical resource block pair (region not hatched) other than an uplink physical resource block where a PUCCH is assigned. In the PUSCH, signals of uplink control information and uplink data which are information other than the uplink control information (Transport Block) are assigned. Radio resources of a PUSCH are allocated using an uplink grant, and are assigned in an uplink subframe after prescribed time (for example, after 4 ms, after 4 subframes, and after 4 TTI) from a downlink subframe in which a PDCCH including this uplink grant has been assigned.

In an uplink grant, information (hereinafter, referred to as "uplink carrier indicator") which indicates PUSCH of a uplink component carrier corresponding to this uplink grant is included. When an uplink carrier indicator is not included in an uplink grant, an uplink grant which does not include an uplink carrier indicator is transmitted by a downlink component carrier associated, in advance, with the uplink component carrier to which this uplink grant corresponds. In each subframe, a plurality of PUSCHs is frequency-multiplexed and spacial-multiplexed in each uplink component carrier. An uplink reference signal is time-multiplexed with a PUCCH and PUSCH, and detailed description thereof is omitted for simplification of description.

Figure 5:
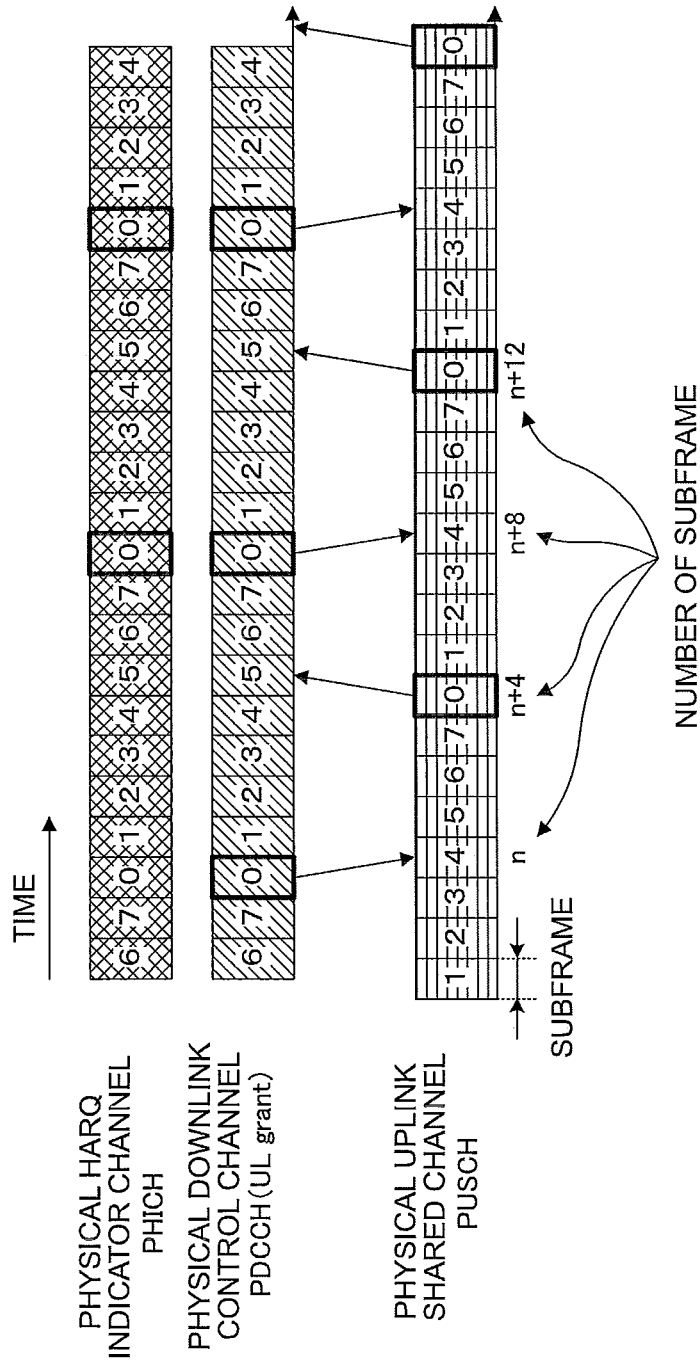
FIG. 5 is a schematic diagram for illustrating an uplink HARQ process of an embodiment of the present invention.

FIG. 5 is a schematic diagram for illustrating an uplink HARQ process of the present invention. In FIG. 5, a horizontal axis is a time domain, a rectangular head hatched with mesh-like lines indicates a PHICH, a square hatched with a slash upward slanting to the right indicates a PDCCH (uplink grant), a square hatched with a horizontal line indicates a PUSCH, and the number given to a PHICH and a PDCCH and a PUSCH indicates the number of a HARQ process to which each channel corresponds. In the present invention, a plurality of (eight) HARQ processes operates independently simultaneously for every uplink component carrier.

A HARQ process number to which a PUSCH corresponds is associated with an uplink subframe number. For example, a remainder value obtained by dividing a subframe number by the number of HARQ processes operating simultaneously within an uplink component carrier is made to be a HARQ process number corresponding to the subframe within the uplink component carrier. The HARQ process number to which a PHICH and a PDCCH (uplink grant) correspond is associated with a downlink subframe number. Between an uplink and a downlink, the corresponding HARQ process numbers are shifted from each other by four.

HARQ processes associated with different uplink component carriers can be performed simultaneously in the same subframe. For example, as shown in FIG. 2, when the mobile station apparatus 1 and the base station apparatus 3 perform communication using three uplink component carriers, HARQ processes of 8×3=24 will operate simultaneously independently. For simplification of description, in FIG. 5, only a PUSCH of one uplink component carrier is shown.

Each of HARQ processes is associated with one HARQ buffer. The mobile station apparatus 1 stores uplink data (transport block) to be transmitted by a PUSCH in a HARQ buffer of a HARQ process corresponding to the PUSCH, and stores an uplink grant received last by the corresponding PDCCH, and stores a HARQ set to ACK or NACK. The base station apparatus 3 stores uplink data received and decoded by a PUSCH in the HARQ buffer of the HARQ process corresponding to the PUSCH, and stores an uplink grant transmitted last by the corresponding PDCCH.

When the mobile station apparatus 1 can transmit a plurality of pieces of uplink data (transport block) by one PUSCH using MIMO (Multiple Input Multiple Output) SM (Spatial Multiplexing), HARQ processes each need to be associated with HARQ buffers of the same number as the number of uplink data (transport block) transmitted by one PUSCH.

A PDCCH (uplink grant) for a HARQ process of a certain uplink component carrier may be transmitted by a downlink component carrier different for every HARQ process timing, and may be transmitted only by a downlink component carrier to which every uplink component carrier is made to correspond. A PHICH for a HARQ process of a certain uplink component carrier is transmitted by a downlink component carrier in which the PDCCH (uplink grant) with respect to the HARQ process was transmitted last.

For example, in FIG. 5, the mobile station apparatus 1 receives, by the n-th downlink subframe, a PDCCH (uplink grant) instructing initial transmission with respect to the 0-th HARQ process, and performs the initial transmission of a PUSCH with respect to the 0-th HARQ process by the (n+4)-th uplink subframe in accordance with this PDCCH (uplink grant). The mobile station apparatus 1 receives a PHICH and a PDCCH (uplink grant) with respect to the 0-th HARQ process by the (n+8)-th downlink subframe, and performs initial transmission or retransmission of a PUSCH with respect to the 0-th HARQ process by the (n+12)-th uplink subframe in accordance with this PHICH or PDCCH (uplink grant).

Thus, the downlink subframe and the uplink subframe corresponding to the same HARQ process are shifted by 4 ms (4 subframes, 4 TTI) from each other. A PHICH, a PDCCH (uplink grant), and a PUSCH for the same HARQ process are transmitted at intervals of 8 ms (8 subframes, 8 TTI).

In an uplink HARQ process of the present invention, the mobile station apparatus 1 sets, first, a HARQ feedback to ACK or NACK which a HARQ indicator received by a PHICH indicates. The mobile station apparatus 1, when having received, by a PDCCH, an uplink grant instructing initial transmission of a PUSCH, without depending on ACK or NACK set as a HARQ feedback, determines new uplink data to be transmitted by the PUSCH and stores this uplink data in a HARQ buffer, and stores the received uplink grant, and performs initial transmission of a PUSCH in accordance with the stored uplink grant, and sets a HARQ feedback to NACK.

The mobile station apparatus 1, when having received, by a PDCCH, an uplink grant instructing, without depending on the HARQ feedback set to a ACK or NACK, retransmission of a PUSCH overwrites the stored uplink grant on the received uplink grant, and retransmits uplink data stored in the HARQ buffer by a PUSCH in accordance with the overwritten uplink grant, and sets a HARQ feedback to NACK. The mobile station apparatus 1, when a HARQ buffer is empty, without depending on whether an uplink grant instructs initial transmission, or instructs retransmission, determines uplink data to be transmitted by a PUSCH, and stores this uplink data in the HARQ buffer, and stores the received uplink grant, and performs initial transmission of a PUSCH in accordance with the stored uplink grant, and sets a HARQ feedback to NACK.

The mobile station apparatus 1, when an uplink grant for a PUSCH is not received, and a HARQ feedback has been set to NACK, retransmits the uplink data stored in the HARQ buffer in accordance with the stored uplink grant by the PUSCH. The mobile station apparatus 1, when an uplink grant for a PUSCH is not received, and ACK has been set as a HARQ feedback, does not perform transmission of the PUSCH, and keeps the uplink data stored in the HARQ buffer which the HARQ process controls.

The mobile station apparatus 1, when receiving an uplink grant for a PUSCH of a UL CC-1 in the n-th subframe of a DL CC-1 in FIG. 5, transmits the PUSCH in the (n+4)-th subframe of the UL CC-1 in accordance with the received uplink grant, and sets a HARQ feedback to NACK. When the DL CC-1 has been deactivated before the (n+8)-th subframe in which the mobile station apparatus 1 receives a PHICH for this PUSCH by the DL CC-1, the mobile station apparatus 1 cannot receive, by DL CC-1, the PHICH in the (n+8)-th subframe. Then, the mobile station apparatus 1, when NACK has been set as a HARQ feedback, will continue retransmission of a PUSCH by an uplink subframe ((n+4+8×i)-th subframe: i is an integer) corresponding to the 0-th HARQ process in accordance with the uplink grant received in the n-th subframe of the DL CC-1.

Figure 6:
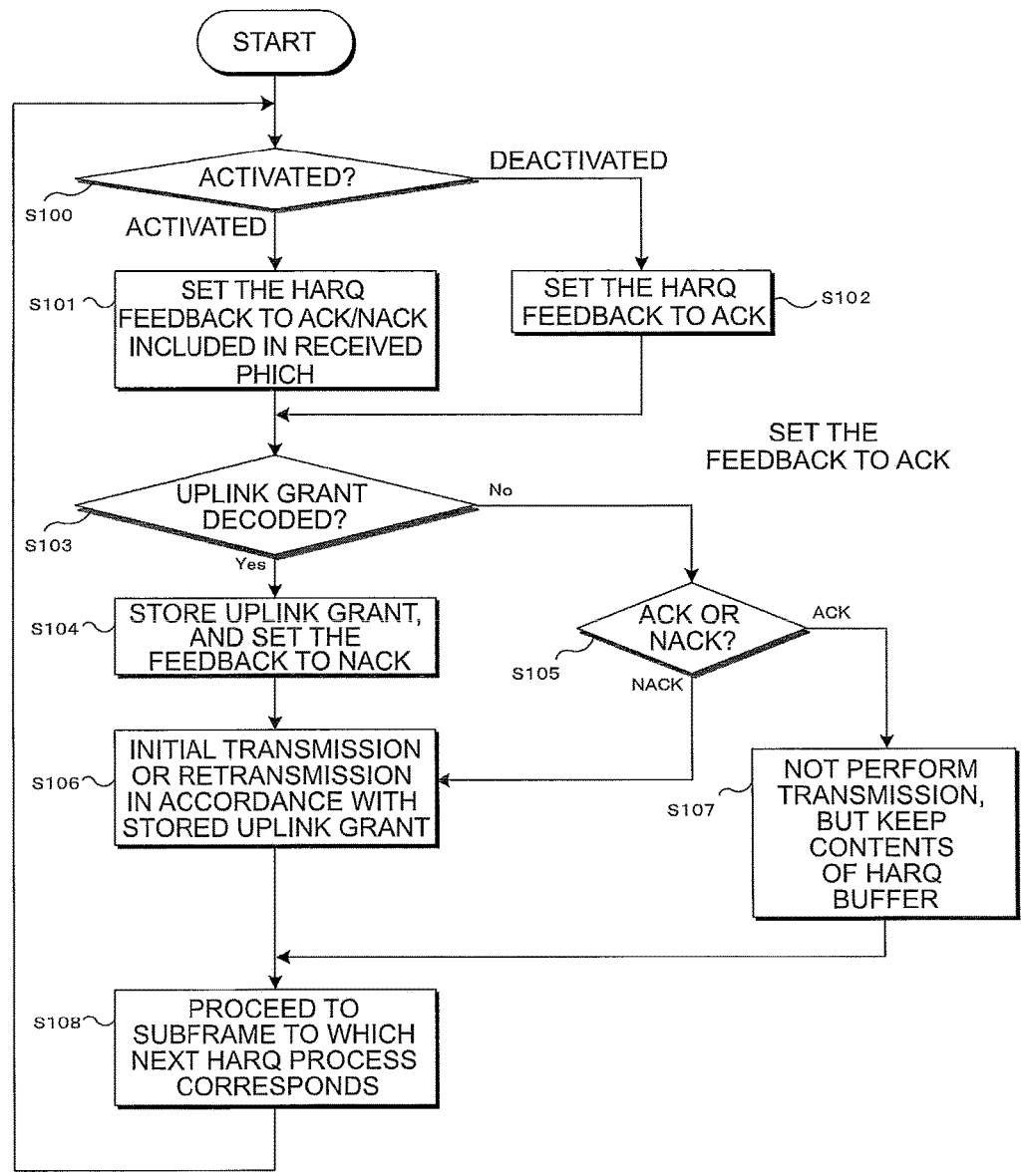
FIG. 6 is a flowchart showing an example of operation of a mobile station apparatus 1 of an embodiment of the present invention.

In order to avoid retransmission unnecessary like this of a PUSCH, the following measures are taken in the present invention. FIG. 6 is a flow chart showing an example of operation of the mobile station apparatus 1 of the present invention. The mobile station apparatus 1 performs processing of FIG. 6 for every HARQ process. The mobile station apparatus 1, when the processing of the HARQ process is started, judges whether a downlink component carrier where a PHICH for a HARQ process is received (that is, a downlink component carrier where an uplink grant for a HARQ process was received last) is activated or not (Step S100).

The mobile station apparatus 1, when it is judged that a downlink component carrier where a PHICH for a HARQ process is received has been activated, receives the PHICH, and sets the HARQ feedback to ACK or NACK which a HARQ indicator included in the received PHICH indicates (Step S101). Then, the mobile station apparatus 1 judges whether an uplink grant addressed to the own apparatus has been detected (Step S103). The mobile station apparatus 1, when it is judged that the uplink grant has been detected, stores the detected uplink grant, and sets the HARQ feedback to NACK (Step S104), and performs initial transmission or retransmission of the PUSCH in accordance with the stored uplink grant (Step S106).

The mobile station apparatus 1, when it is judged that the uplink grant has not been detected in Step S103, judges whether either of the HARQ feedback is set to ACK or NACK (Step S105). The mobile station apparatus 1, when it is judged that the HARQ feedback has been set to NACK in Step S105, performs retransmission of the PUSCH in accordance with the stored uplink grant (Step S106). The mobile station apparatus 1, when it is judged that the HARQ feedback has been set to ACK in Step S105, does not perform transmission of a PUSCH, and keeps contents of the HARQ buffer corresponding to the HARQ process (Step S107).

The mobile station apparatus 1, after Step S106 and Step S107, returns to Step S100 in a next downlink subframe corresponding to this HARQ process (Step S108), and judges whether a downlink component carrier where a PHICH for the HARQ process is received has been activated or not.

In Step S100, the mobile station apparatus 1, when it is judged that a downlink component carrier where a PHICH is received has not been activated, that is, has been deactivated, does not receive the PHICH, and sets the HARQ feedback to ACK (Step S102). When a downlink component carrier where an uplink grant for the HARQ process of the uplink component carrier can be transmitted does not exist in the activated downlink component carriers, the mobile station apparatus 1, after setting ACK in Step S102, judges that the uplink grant has not been detected in Step S103, and judges that ACK has been set in the HARQ feedback in Step S105, and in Step S107, does not transmit a PUSCH, and keeps contents of the HARQ buffer corresponding to the HARQ process.

When a downlink component carrier where an uplink grant for the HARQ process of the uplink component carrier can be transmitted exists in the activated downlink component carriers, the base station apparatus 3 transmits the uplink grant by the activated downlink component carrier where an uplink grant can be transmitted, and thereby, the mobile station apparatus 1, after setting ACK in Step S102, judges that the uplink grant has been detected in Step S103, and in Step S106, can perform initial transmission or retransmission of a PUSCH in accordance with the received and detected uplink grant.

When a HARQ buffer associated with a HARQ process is empty, or when a HARQ process is not used even only once for communication with the base station apparatus after turning on mobile station apparatus 1, or when the HARQ feedback has been set to ACK, and so on, the mobile station apparatus 1 in Step S101 may not receive the PHICH corresponding to this HARQ process. When an uplink grant instructing retransmission is received after keeping the contents of the HARQ buffer in Step S107, the contents of the HARQ buffer can be retransmitted by a PUSCH. For example, the base station apparatus 3 transmits an uplink grant by an activated downlink component carrier, and deactivates the downlink component carrier used for transmission of the uplink grant, and activates again the deactivated downlink component carrier, and can instruct the mobile station apparatus 1 to retransmit the PUSCH transmitted in an activated state last time.

Figure 7:
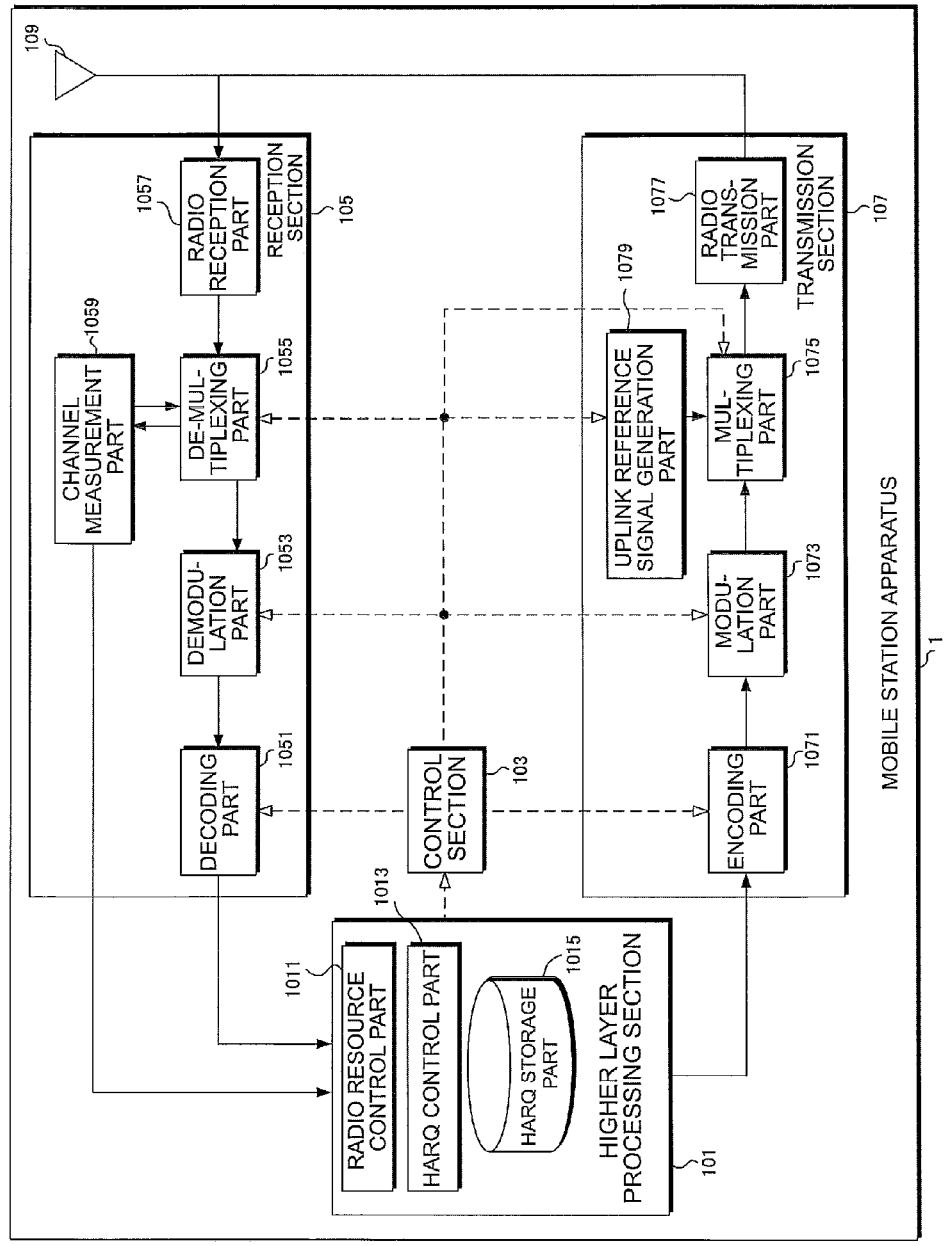
FIG. 7 is a schematic block diagram showing a configuration of the mobile station apparatus 1 of an embodiment of the present invention.

FIG. 7 is a schematic block diagram showing a configuration of the mobile station apparatus 1 of an embodiment of the present invention. As illustrated, the mobile station apparatus 1 includes an higher layer processing section 101, a control section 103, a reception section 105, a transmission section 107, and a transmitting-receiving antenna 109. The higher layer processing section 101 includes a radio resource control part 1011, a HARQ control part 1013, and a HARQ storage part 1015. The reception section 105 includes a decoding part 1051, a demodulation part 1053, a de-multiplexing part 1055, a radio reception part 1057, and a channel measurement part 1059. The transmission section 107 includes an encoding part 1071, a modulation part 1073, a multiplexing part 1075, a radio transmission part 1077, and an uplink reference signal generation part 1079.

The higher layer processing section 101 outputs uplink data generated by a user's operation or the like, an RRC signal, and a MAC CE to the transmission section 107. The higher layer processing section 101 performs processing of a medium access control (MAC) layer, a packet data convergence protocol (PDCP) layer, a radio link control (RLC) layer, and a radio resource control (RRC) layer. The higher layer processing section 101 generates control information to perform control of the reception section 105 and the transmission section 107 based on downlink control information or the like received by a PDCCH, and outputs it to the control section 103. The radio resource control part 1011 included in the higher layer processing section 101 performs control of various setting information of the own apparatus. For example, the radio resource control part 1011 performs control of an RNTI such as a C-RNTI. The radio resource control part 1011 generates information assigned in each uplink channel, and outputs it to the transmission section 107.

The radio resource control part 1011 performs control of downlink component carriers and uplink component carriers configured by an RRC signal notified of from the base station apparatus 3, and downlink component carriers activated or deactivated by an activation command or the like. The radio resource control part 1011 controls downlink component carriers where downlink assignments for configured downlink component carriers and uplink grants for configured uplink component carriers is assigned.

The HARQ control section 1013 which the higher layer processing section 101 includes maintains an uplink HARQ process. The HARQ storage part 1015 which the higher layer processing section 101 includes has a HARQ buffer associated with each uplink HARQ process which the HARQ control section 1013 maintains. The HARQ storage part 1015 stores an uplink grant and HARQ feedback (ACK or NACK) which are associated with each HARQ process. Since a downlink HARQ process is not associated with the present invention, description thereof is omitted.

The HARQ control section 1013 carries out the following operations for every HARQ process. The HARQ control section 1013 inputs uplink data (transport block) transmitted by a PUSCH into a HARQ buffer, and makes the HARQ storage part 1015 store ACK or NACK which a HARQ indicator received by a PHICH input from the reception section 105 indicates and an uplink grant received by a PDCCH. The HARQ control section 1013 performs control of the HARQ in accordance with the flow chart of FIG. 6 based on ACK or NACK and an uplink grant which are made to be stored in the HARQ storage part 1015.

The HARQ control section 1013 associates an uplink component carrier and a number (timing) of subframe where a PUSCH is transmitted with a HARQ process. The HARQ control section 1013, among a plurality of PHICHs in a downlink component carrier where an uplink grant was received last, determines a PHICH corresponding to this HARQ process based on an allocation of a physical resource block of a PUSCH and information included in an uplink grant with respect to a cyclic shift of an uplink reference signal which is time-multiplexed with a PUSCH.

The HARQ control section 1013, based on an uplink carrier indicator included in an uplink grant and a subframe number (timing) where the uplink grant was received, determines a HARQ process to which the received uplink grant corresponds. The HARQ control section 1013, when an uplink carrier indicator is not included in an uplink grant, determines a HARQ process to which the received uplink grant corresponds based on a downlink component carrier and a number (timing) of subframe where this uplink grant was received.

The control section 103 generates a control signal by which control of the reception section 105 and the transmission section 107 is performed based on control information from the higher layer processing section 101. The control section 103 outputs the generated control signal to the reception section 105 and the transmission section 107, and performs control of the reception section 105 and the transmission section 107. The reception section 105 separates, demodulates, and decodes a reception signal received from the base station apparatus 3 via the transmitting-receiving antenna 109 in accordance with a control signal input from the control section 103, and outputs the decoded information to the higher layer processing section 101.

The radio reception part 1057 converts a downlink signal received via the transmitting-receiving antenna 109 into an intermediate frequency (down covert), and removes a needless frequency component, and controls an amplification level so that a signal level may be maintained appropriately, and quadrature-demodulates based on an in-phase component and orthogonal component of the received signal, and converts the quadrature-demodulated analog signal into a digital signal. The radio reception part 1057 removes a portion corresponding to a guard interval (GI) from the converted digital signal, and performs a fast Fourier transform (FFT) on the signal from which the guard interval has been removed, and extracts a frequency domain signal.

The de-multiplexing part 1055 separates the extracted signal each into a PHICH, a PDCCH, a PDSCH and a downlink reference signal. The separation is performed based on allocation information or the like of radio resources notified of by the downlink assignment. The de-multiplexing part 1055 performs channel compensation of a PHICH, a PDCCH and a PDSCH from a channel estimate value input from the channel measurement part 1059. The de-multiplexing part 1055 outputs the separated downlink reference signal to the channel measurement part 1059.

The demodulation part 1053 performs demodulation of a BPSK (Binary Phase Shift Keying) modulation scheme for a PHICH, and outputs it to the decoding part 1051. The decoding part 1051 decodes a PHICH addressed to the own apparatus, and outputs the decoded HARQ indicator to the higher layer processing section 101. The demodulation part 1053 performs demodulation of a QPSK modulation scheme for a PDCCH, and outputs it to decoding part 1051. The decoding part 1051 tries blind decoding of a PDCCH, and when having succeeded in the blind decoding, outputs an RNTI included in the decoded downlink control information and the downlink control information to the higher layer processing section 101.

The demodulation part 1053, for a PDSCH, performs demodulation of a modulation scheme such as QPSK (Quadrature Phase Shift Keying), 16 QAM (Quadrature Amplitude Modulation), 64 QAM or the like, which is notified of by the downlink assignment, and outputs it to the decoding part 1051. The decoding part 1051 performs decoding based on information on a coding rate notified of by the downlink control information, and outputs the decoded downlink data (transport block) to the higher layer processing section 101.

The channel measurement part 1059 measures a downlink path loss or a channel state based on the downlink reference signal input from the de-multiplexing part 1055, and outputs the measured path loss or channel state to the higher layer processing section 101. The channel measurement part 1059 calculates a downlink channel estimate value based on the downlink reference signal, and outputs it to the de-multiplexing part 1055.

The transmission section 107 generates an uplink reference signal in accordance with the control signal input from the control section 103, and encodes and modulates uplink data (transport block) input from the higher layer processing section 101, and multiplexes a PUCCH, a PUSCH and the generated uplink reference signal, and transmits it to the base station apparatus 3 via the transmitting-receiving antenna 109. The encoding part 1071 performs encoding, such as convolution encoding, and block encoding of the uplink control information input from the higher layer processing section 101, and performs turbo-encoding of uplink data based on information on a coding rate notified of by an uplink grant. The modulation part 1073 modulates encoded bits input from the encoding part 1071 by a modulation scheme such as BPSK, QPSK, 16 QAM, 64 QAM, or the like which is notified of by the downlink control information, or by a modulation scheme determined in advance for every channel.

The uplink reference signal generation part 1079 generates a sequence which is known by the base station apparatus 3 and can be calculated by a rule which is determined in advance on the basis of: a physical cell identity for identifying the base station apparatus 3 (physical cell identity: referred to as PCI, Cell ID, or the like); a bandwidth for assigning an uplink reference signal; and a cyclic shift notified of by an uplink grant or the like. The multiplexing part 1075, after rearranging modulation symbols of a PUSCH in parallel in accordance with a control signal input from the control section 103, carries out discrete Fourier transform (Discrete Fourier Transform: DFT), and multiplexes signals of a PUCCH and PUSCH and the generated uplink reference signal.

The radio transmission part 1077: carries out inverse FFT (IFFT) of the multiplexed signal; carries out modulation of a SC-FDMA scheme; adds a guard interval to the SC-FDMA symbols on which the SC-FDMA modulation has been carried out; generates a baseband digital signal; converts the baseband digital signal into an analog signal; generates an in-phase component and orthogonal component of an intermediate frequency from the analog signal; removes an excessive frequency component against the intermediate frequency band; converts the intermediate frequency signal into a high frequency signal (up convert); removes an excessive frequency component; carries out power amplification; and outputs it to the transmitting-receiving antenna 109 to be transmitted.

Figure 8:
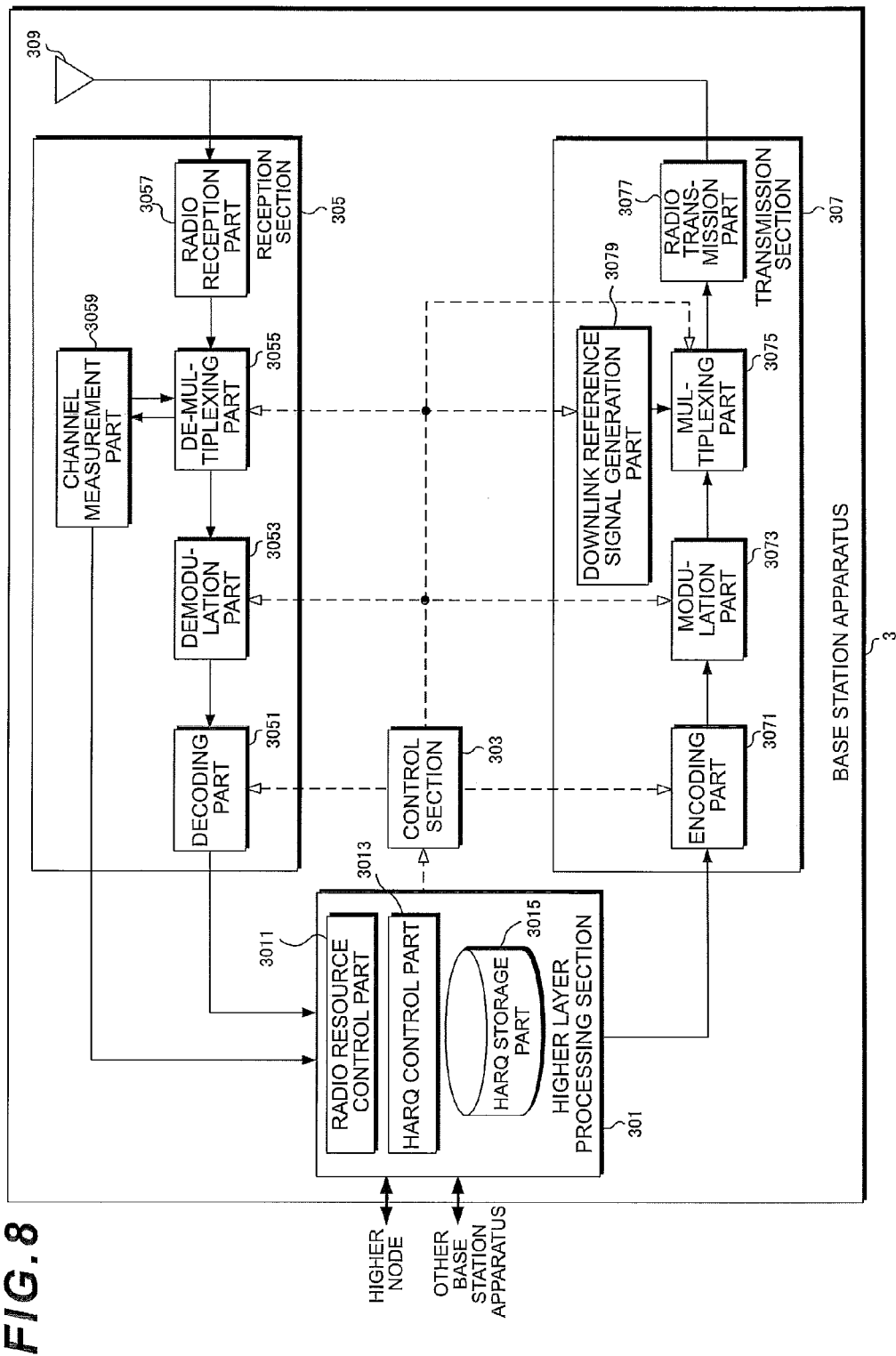
FIG. 8 is a schematic block diagram showing a configuration of abase station apparatus 3 of an embodiment of the present invention.

FIG. 8 is a schematic block diagram showing a configuration of the base station apparatus 3 of an embodiment of the present invention. As illustrated, the base station apparatus 3 includes an higher layer processing section 301, a control section 303, a reception section 305, a transmission section 307, and a transmitting-receiving antenna 309. The higher layer processing section 301 includes a radio resource control part 3011, a HARQ control part 3013, and a HARQ storage part 3015. The reception section 305 includes a decoding part 3051, a demodulation part 3053, a de-multiplexing part 3055, a radio reception part 3057, and a channel measurement part 3059. The transmission section 307 includes an encoding part 3071, a modulation part 3073, a multiplexing part 3075, a radio transmission part 3077, and a downlink reference signal generation part 3079.

The higher layer processing section 301 performs processing of a medium access control (MAC) layer, a packet data convergence protocol (PDCP) layer, a radio link control (RLC) layer, and a radio resource control (RRC) layer. The higher layer processing section 301 generates control information to perform control of the reception section 305 and the transmission section 307, and outputs it to the control part 303. The radio resource control part 3011 which the higher layer processing section 301 includes generates, or acquires from an higher node, downlink data (transport block), an RRC signal, and a MAC CE assigned in a downlink PDSCH, and outputs them to the transmission section 307. The radio resource control part 3011 carries out control of a various setting information of each mobile station apparatus 1. For example, the radio resource control part 3011 performs control of an RNTI, such as allocating a C-RNTI to the mobile station apparatus 1.

The radio resource control part 3011 performs control of downlink component carriers and uplink component carriers which are set for each mobile station apparatus 1, and of downlink component carriers which is activated or deactivated. The radio resource control part 3011 configures, in each mobile station apparatus 1, downlink component carriers and uplink component carriers which are used for communication, and controls the transmission section 307 via the control section 303 so as to notify of the information on this configuration by an RRC signal.

The radio resource control part 3011 configures, in each mobile station apparatus 1, downlink component carriers where PDCCHs for downlink component carriers and uplink component carriers which are used for communication is assigned, and controls the transmission section 307 via the control section 303 so as to notify of the information on this configuration by an RRC signal. The radio resource control part 3011 controls the transmission section 307 via the control section 303 so as to notify each mobile station apparatus 1 of an activation command by a PDCCH or MAC CE.

The HARQ control section 3013 which the higher layer processing section 301 includes maintains an uplink HARQ process of each mobile station apparatus 1. The HARQ storage part 3015 which the higher layer processing section 301 includes has a plurality of HARQ buffers corresponding to each uplink HARQ process which the HARQ control part 3013 controls. Description is omitted since a downlink HARQ process does not have a relation to the present invention. The HARQ control part 3013 inputs uplink data (transport block) received by a PUSCH input from the reception section 305 into a HARQ buffer, and judges whether decoding of the uplink data has been successful or not using an error detecting code (cyclic redundancy check code) added to the uplink data.

The HARQ control part 3013 generates a HARQ indicator indicating ACK when it is judged that decoding of the uplink data is successful, and generates a HARQ indicator indicating NACK when it is judged that decoding of the uplink data is not successful, and outputs it to the transmission section 307. The HARQ control part 3013, when it is judged that decoding of the uplink data is not successful, may change information on a radio resource allocation, a modulation scheme and a coding rate, and may control the transmission section 307 via the control section 303 so as to transmit an uplink grant instructing retransmission and including the changed information.

The HARQ control part 3013, when uplink data retransmitted in the mobile station apparatus 1 is input from the reception section 305, synthesizes the uplink data already saved in a HARQ buffer and the retransmitted uplink data, and judges whether decoding of the uplink data has been successful. The HARQ control part 3013 associates an uplink component carrier and a number (timing) of subframe where the mobile station apparatus 1 transmits a PUSCH with a HARQ process number.

The HARQ control part 3013, among a plurality of PHICHs in a downlink component carrier where an uplink grant was transmitted last for a certain HARQ process, determines a PHICH used for transmitting ACK/NACK corresponding to this HARQ process based on an allocation of a physical resource block of a PUSCH and information included in an uplink grant with respect to a cyclic shift of an uplink reference signal which is time-multiplexed with the PUSCH.

The control section 303 generates a control signal by which control of the reception section 305 and the transmission section 307 is performed based on control information from the higher layer processing section 301. The control section 303 outputs the generated control signal to the reception section 305 and the transmission section 307 to perform control of the reception section 305 and the transmission section 307.

The reception section 305 separates, demodulates and decodes a reception signal received from the mobile station apparatus 1 via the transmitting-receiving antenna 309 in accordance with a control signal input from the control section 303, and outputs the decoded information to the higher layer processing section 301. The radio reception part 3057 converts an uplink signal received via the transmitting-receiving antenna 309 into an intermediate frequency (down convert), and removes a needless frequency component, and controls an amplification level so that the signal level may be maintained appropriately, and quadrature-demodulates the signal based on an in-phase component and orthogonal component of the received signal, and converts the quadrature-demodulated analog signal into a digital signal. The radio reception part 3057 removes a portion corresponding to a guard interval (GI) from the converted digital signal. The radio reception part 3057 performs a fast Fourier transform (FFT) on the signal from which the guard interval has been removed, and extracts a frequency domain signal, and outputs to the de-multiplexing part 3055.

The de-multiplexing part 3055 separates the signal input from the radio reception part 3057 into signals, such as a PUCCH, a PUSCH and an uplink reference signal. This separation is performed based on the allocation information on radio resources included in the uplink grant which has been determined, in advance, by the base station apparatus 3 in the radio resource control part 3011, and has been notified of to each mobile station apparatuses 1. The de-multiplexing part 3055 performs channel compensation of a PUCCH and PUSCH based on a channel estimate value input from the channel measurement part 3059. The de-multiplexing part 3055 outputs the separated uplink reference signal to the channel measurement part 3059.

The demodulation part 3053 carries out inverse discrete Fourier transform (IDFT) of a PUSCH, and acquires modulation symbols, and performs demodulation of the reception signal using a modulation scheme, such as BPSK (Binary Phase Shift Keying), QPSK, 16 QAM, or 64 QAM which is determined in advance for each of modulation symbols of a PUCCH and PUSCH, or a modulation scheme of which the own apparatus has notified each mobile station apparatus 1 by an uplink grant in advance.

The decoding part 3051 performs decoding of encoded bits of the demodulated PUCCH and PUSCH by a coding rate of a predetermined encoding scheme which has been determined in advance, or which has been notified of by the own apparatus to the mobile station apparatus 1 in advance by an uplink grant, and outputs the decoded uplink data and uplink control information to the higher layer processing section 301. In the case of PUSCH retransmission, the decoding part 3051 performs decoding using encoded bits held in a HARQ buffer input from the higher layer processing section 301 and using received encoded bits. The channel measurement part 3059 measures a channel estimate value and a channel quality or the like based on an uplink reference signal input from the de-multiplexing part 3055, and outputs to the de-multiplexing part 3055 and the higher layer processing section 301.

The transmission section 307, in accordance with a control signal input from the control section 303, generates a downlink reference signal, and encodes and modulates a HARQ indicator, downlink control information and downlink data which are input from the higher layer processing section 301, and multiplexes a PHICH, a PDCCH, a PDSCH and the downlink reference signal, and transmits the signal to the mobile station apparatus 1 via the transmitting-receiving antenna 309.

The encoding part 3071 performs encoding of a HARQ indicator, downlink control information and downlink data which are input from the higher layer processing section 301 using a predetermined encoding scheme, such as block coding, convolutional encoding and turbo encoding, or performs encoding using an encoding scheme which the radio resource control part 3011 has determined. The modulation part 3073 modulates encoded bits input from the encoding part 3071 by a predetermined modulation scheme such as BPSK, QPSK, 16 QAM or 64 QAM, or a modulation scheme determined by the radio resource control part 3011. The downlink reference signal generation part 3079 generates a sequence which is calculated under a predetermined rule on the basis of a physical cell identity (PCI) for identifying the base station apparatus 3, and which the mobile station apparatus 1 has known as a downlink reference signal. The multiplexing part 3075 multiplexes modulated each channel and the generated downlink reference signal.

The radio transmission part 3077: carries out inverse FFT (IFFT) of multiplexed modulation symbols and performs modulation of an OFDM system; adds a guard interval to OFDM-modulated OFDM symbols; generates a baseband digital signal; converts the baseband digital signal into an analog signal; generates an in-phase component and orthogonal component of an intermediate frequency from the analog signal; removes an excessive frequency component to the intermediate frequency band; converts the intermediate frequency signal into a high frequency signal (up convert); removes an excessive frequency component; carries out power amplification; and outputs to the transmitting-receiving antenna 309 and transmits.

Thus, according to the present invention, in a wireless communication system in which the mobile station apparatus 1 and the base station apparatus 3 communicate using a plurality of downlink component carriers, when a downlink component carrier receiving a PHICH where a HARQ indicator for uplink data (transport block) which the mobile station apparatus 1 has transmitted to the base station apparatus 3 is assigned has been deactivated, the mobile station apparatus 1 sets HARQ feedback to ACK in a corresponding HARQ process without receiving the HARQ indicator by the PHICH, and the base station apparatus 3 judges that the mobile station apparatus 1 has set the HARQ feedback to ACK in the corresponding HARQ process without receiving the HARQ indicator assigned in the PHICH.

The present invention can acquire the same effect also when a downlink component carrier where a PHICH is received is excluded from configurations of downlink component carriers used for communication using an RRC signal. That is, when a downlink component carrier where a PHICH is received is excluded from downlink component carriers used for communication, the mobile station apparatus 1 sets ACK in the corresponding HARQ process.

In Steps S100 and S102 of FIG. 6, when a downlink component carrier has been deactivated at the timing where the mobile station apparatus 1 receives a PHICH, the mobile station apparatus 1 sets ACK, and however, at the time where the mobile station apparatus 1 has transmitted a PUSCH in Step S106 of FIG. 6, when it is known that a downlink component carrier where a PHICH is received will be deactivated previous to receiving a PHICH for this PUSCH, the mobile station apparatus 1 may set ACK after Step S106. Thereby, the mobile station apparatus 1, when a downlink component carrier where a PHICH is received has been deactivated, can avoid leaving control of the base station apparatus 3, and carrying out unnecessary retransmission of a PUSCH, and can perform control of retransmission of a PUSCH effectively.

The present invention may be applied to the case where it is configured using an RRC signal that a downlink component carrier where a PHICH for a certain uplink component carrier is received is not a downlink component carrier where a uplink grant for the uplink component carrier is assigned. That is, when a downlink component carrier where a PHICH is received is excluded from downlink component carriers where an uplink grant is assigned, the mobile station apparatus 1 sets ACK in the corresponding HARQ process.

For example, in FIG. 2, when a downlink component carrier where an uplink grant for a UL CC-1 is transmitted has been configured as a DL CC-1, the mobile station apparatus 1 receives the uplink grant and PHICH for the UL CC-1 by the DL CC-1. Before the mobile station apparatus 1 receives the PHICH by the DL CC-1, when the base station apparatus 3 reconfigures a downlink component carrier where an uplink grant for the UL CC-1 is transmitted in a DL CC-2 and the mobile station apparatus 1 applies this configuration, the mobile station apparatus 1 will receive the PHICH for the UL CC-1 by the DL CC-1 and will monitor an uplink grant for the UL CC-1 by the DL CC-2, and a load of reception processing of the mobile station apparatus 1 will increase.

Then, by applying the present invention, before the mobile station apparatus 1 receives the PHICH by the DL CC-1, when the base station apparatus 3 has reconfigured in the DL CC-2 a downlink component carrier where an uplink grant for the UL CC-1 is transmitted and the mobile station apparatus 1 has applied this configuration, the mobile station apparatus 1 sets ACK in the HARQ process of the UL CC-1, and monitors only the uplink grant of the DL CC-2 without carrying out reception processing of the PHICH of the DL CC-1, and therefore, a load of the reception processing of the mobile station apparatus 1 can be reduced.

Second Embodiment

Hereinafter, a second embodiment of the present invention will be described in detail, referring to drawings.

In the second embodiment of the present invention, the mobile station apparatus 1, in case that all downlink component carriers where a PHICH (HARQ indicator) and a PDCCH (uplink grant) for an uplink component carrier are assigned have been deactivated, flushes (deletes contents) of all HARQ buffers associated with the uplink component carriers, and the base station apparatus 3, in case that, for the mobile station apparatus 1, all downlink component carriers where a PHICH (HARQ indicator) and PDCCH (uplink grant) for an uplink component carrier are assigned have been deactivated, judges that the mobile station apparatus 1 flushes all HARQ buffers associated with the uplink component carriers.

Besides, when a downlink component carrier where an uplink grant for a certain uplink component carrier is assigned is limited to one, in case that a downlink component carrier where a HARQ indicator for an uplink component carrier is assigned has been deactivated, it can also be expressed that all HARQ buffers associated with this uplink component carrier are flushed.

For example, in FIG. 2, the mobile station apparatus 1, when it is configured that an uplink grant for a UL CC-1 is assigned only in a DL CC-1, flushes all the HARQ buffers associated with the UL CC-1 if the DL CC-1 is deactivated. For example, in FIG. 2, when it is configured that an uplink grant for a UL CC-1 is assigned in a DL CC-1, a DL CC-2, and a DL CC-3 for the mobile station apparatus 1, the mobile station apparatus 1 flushes all the HARQ buffers associated with the UL CC-1 if the DL CC-1, the DL CC-2, and the DL CC-3 are all deactivated.

Thus, the mobile station apparatus 1, by flushing HARQ buffers associated with HARQ processes which cannot receive the corresponding PHICH (HARQ indicator) and PDCCH (uplink grant), does not perform retransmission of a PUSCH even though a HARQ feedback is set to NACK of the HARQ process.

Even though downlink component carriers where a HARQ indicator and uplink grant for an uplink component carrier may be assigned are all deactivated, when although transmission of a PUSCH has been determined in a HARQ process, the PUSCH has not been transmitted yet (when there is pending PUSCH transmission), HARQ buffers may be flushed after this PUSCH has been transmitted.

For example, the mobile station apparatus 1, when after receiving an uplink grant, in a period before transmitting PUSCH (4 ms, four subframes, 4 TTI) based on the received uplink grant, a downlink component carrier where the uplink grant has been received has been deactivated, may flushes a HARQ buffer after transmitting PUSCH once. Thus, the previous PUSCH which is transmitted actually after 4 subframes after PHICH (HARQ indicator) or PDCCH (uplink grant) has been received is referred to as a pending PUSCH.

Figure 9:
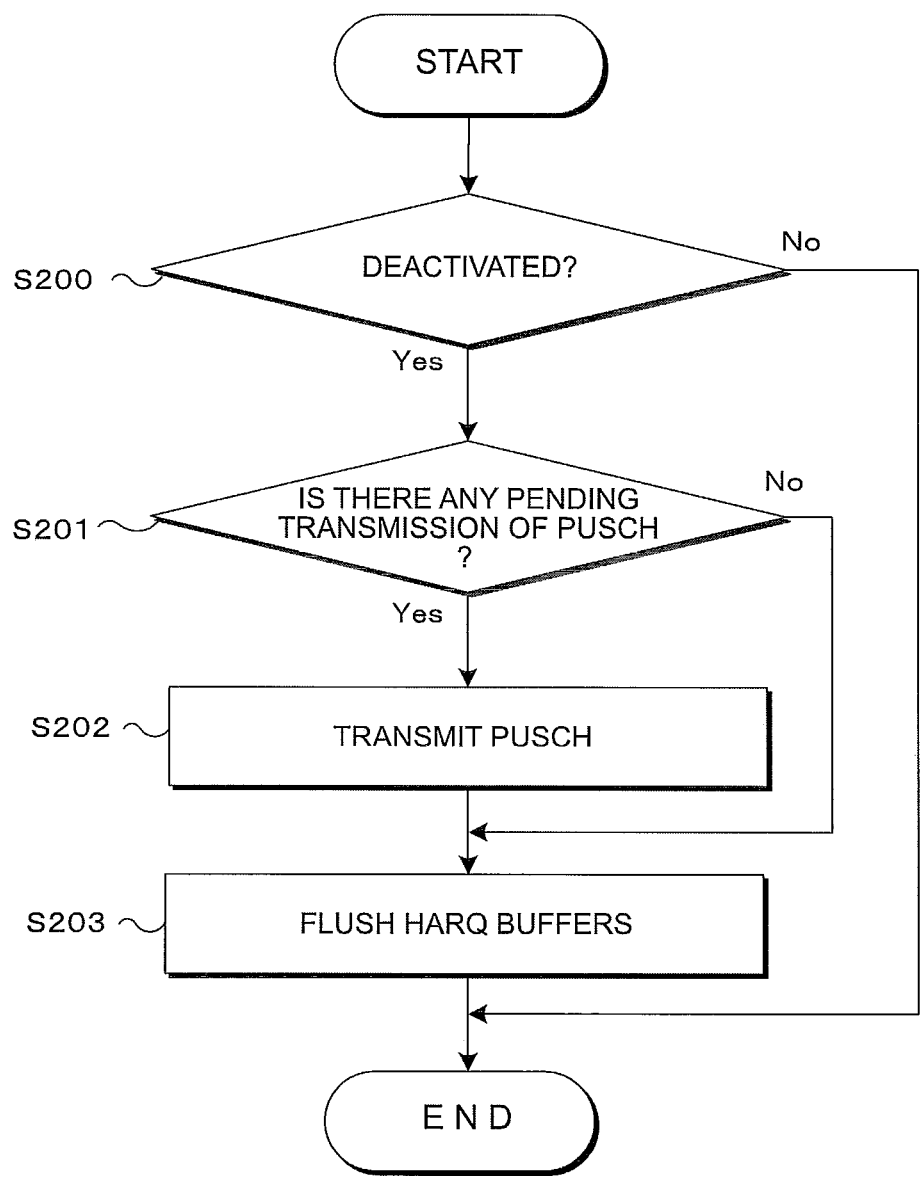
FIG. 9 is a flow chart showing an example of operation of the mobile station apparatus 1 of a second embodiment of the present invention.

FIG. 9 is a flow chart showing an example of operation of the mobile station apparatus 1 of the second embodiment of the present invention. The mobile station apparatus 1 performs processing of FIG. 9 for every HARQ process. When the processing is started, the mobile station apparatus 1 judges whether a downlink component carrier where a PHICH (HARQ indicator) and a PDCCH (uplink grant) for a HARQ process associated with a certain uplink component carrier are assigned has been deactivated (Step S200).

The mobile station apparatus 1, in Step S200, in case that having judged that a downlink component carrier where PHICHs (HARQ indicator) and PDCCHs (uplink grant) for HARQ processes associated with a certain uplink component carrier are assigned has been all deactivated, judges whether there is any pending transmission of a PUSCH (Step S201).

The mobile station apparatus 1, in case that it is judged that there is the pending transmission of a PUSCH in Step S201, flushes HARQ buffers associated with this uplink component carrier (Step S203) after transmitting the pending transmission of the PUSCH (Step S202). The mobile station apparatus 1, in case that it is judged that there is no pending transmission of a PUSCH in Step S201, flushes HARQ buffers associated with this uplink component carrier after processing is made to be progressed to Step S203.

The mobile station apparatus 1, in Step S200, in case that it is judged that all downlink component carriers where PHICHs (HARQ indicator) and PDCCHs (uplink grant) for HARQ processes associated with a certain uplink component carrier are assigned have been deactivated, may be made to cancel transmission of the PUSCH of the uplink component carrier in the subsequent subframe without performing Step S201 and Step S202, and flush HARQ buffers (Step S203). After Step S203, the mobile station apparatus 1 finishes processing. The mobile station apparatus 1, in Step S200, finishes processing in case that it is judged that there is at least one which has not been deactivated among downlink component carriers where a PHICH (HARQ indicator) and a PDCCH (uplink grant) for a HARQ process associated with a certain uplink component carrier are assigned.

In comparing the wireless communication system according to the second embodiment with the wireless communication system according to the first embodiment, the higher layer processing section 101 of the mobile station apparatus 1 is found to be different. However, since a configuration and function which other constituents have are the same as the first embodiment, descriptions with respect to the same function as the first embodiment are omitted.

The HARQ control part 1013 of the higher layer processing section 101 of the mobile station apparatus 1 of the second embodiment does not set ACK in a HARQ process as a HARQ feedback in case that a downlink component carrier where a PHICH (HARQ indicator) for an uplink component carrier is assigned has been deactivated. Then, The HARQ control part 1013, in case that all downlink component carriers where PHICHs (HARQ indicator) and PDCCHs (uplink grant) for an uplink component carrier are assigned have been deactivated, flushes HARQ buffers which the HARQ storage part 1015 has and which is associated with this uplink component carrier.

The mobile station apparatus 1 may change the timing of flushing HARQ buffers in accordance with how the downlink component carrier having been deactivated. The mobile station apparatus 1 uses: a method of deactivating the downlink component carrier which is notified, by an activation command, that it is not used for downlink communication, after a prescribed time (for example, 4 ms, 4 subframes, or 4 TTI) from receiving the activation command (hereinafter, referred to as Explicit deactivation); a method of deactivating a downlink component carrier when a prescribed time (for example, 100 ms, 100 subframes, or 100 TTI) has elapsed after the downlink component carrier was activated by an activation command; and a method of deactivating a downlink component carrier when a prescribed time (for example, 10 ms, 10 subframes, 10 TTI) has elapsed after a PDCCH or a PDSCH were received last by the activated downlink component carrier (hereinafter, methods other than a method of performing deactivating after a prescribed time after an activation command was received is referred to as Implicit deactivation).

The base station apparatus 3, in case that a downlink component carrier which will be deactivated after a prescribed time by Implicit deactivation is wanted to be kept maintained in a state of activation, notifies the mobile station apparatus 1 of an activation command, or transmits a PDCCH or a PDSCH to the mobile station apparatus 1 by a downlink component carrier which is wanted to be kept maintained in a state of activation. The mobile station apparatus 1 is provided with a timer which measures passage of time after a downlink component carrier was activated by an activation command and a timer which measures passage of time after a PDCCH or a PDSCH were received last by an activated downlink component carrier, and the mobile station apparatus 1 resets the timers for the corresponding downlink component carriers when an activation command is notified of, or a PDCCH or PDSCH are received. For example, the mobile station apparatus 1, in the case of Explicit deactivation, flushes HARQ buffers when deactivating a downlink component carrier, and in the case of Implicit deactivation, may flushes HARQ buffers after a prescribed time has elapsed from deactivating a downlink component carrier.

Then, the base station apparatus 3, in spite of wanting to continue uplink communication (retransmission of a PUSCH), can not notify the mobile station apparatus 1 of an activation command correctly, or can not transmit a PDCCH and a PDSCH appropriately to the mobile station apparatus 1, and the mobile station apparatus 1 has deactivated a downlink component carrier by Implicit deactivation, and even then, since the mobile station apparatus 1 keeps contents of HARQ buffers for a prescribed period of time, the base station apparatus 3, by activating, using an activation command, a downlink component carrier which has been deactivated and transmitting an uplink grant instructing retransmission by the activated downlink component carrier, can make the mobile station apparatus 1 perform retransmission of the PUSCH immediately.

Thereby, the mobile station apparatus 1, when all downlink component carriers receiving a PHICH (HARQ indicator) and PDCCH (uplink grant) have been deactivated, can avoid leaving control of the base station apparatus 3, and carrying out unnecessary retransmission of a PUSCH, and can perform control of retransmission of a PUSCH effectively.

The present invention can acquire the same effect by being applied also to the case where all downlink component carriers where PHICHs (HARQ indicator) and PDCCHs (uplink grant) are received are excluded from configurations of downlink component carriers used for communication using an RRC signal. That is, in case that all downlink component carriers where PHICHs (HARQ indicator) and PDCCHs (uplink grant) are received are excluded from configurations, the mobile station apparatus 1 flushes HARQ buffers associated with this uplink component carrier.

The present invention may be applied to the case where it is configured using an RRC signal that a downlink component carrier where a PHICH for a certain uplink component carrier is received is not a downlink component carrier where an uplink grant for the uplink component carrier is assigned. That is, when a downlink component carrier where a PHICH is received is excluded from downlink component carriers where an uplink grant is assigned, the mobile station apparatus 1 sets ACK in the corresponding HARQ processes.

For example, in FIG. 2, when a downlink component carrier where an uplink grant for a UL CC-1 is transmitted is configured as a DL CC-1, the mobile station apparatus 1 receives the uplink grant and the PHICH for the UL CC-1 by the DL CC-1. When before the mobile station apparatus 1 receives a PHICH by a DL CC-1, the base station apparatus 3 reconfigures, in a DL CC-2, a downlink component carrier which transmits an uplink grant for a UL CC-1, and the mobile station apparatus 1 has applied this configuration, then the mobile station apparatus 1 will receive the PHICH for the UL CC-1 by the DL CC-1 and monitor an uplink grant for the UL CC-1 by the DL CC-2, and a load of reception processing of the mobile station apparatus 1 will increase.

Then, by applying the present invention, before the mobile station apparatus 1 receives a PHICH by a DL CC-1, when the base station apparatus 3 has reconfigured, in DL CC-2, a downlink component carrier where an uplink grant for the UL CC-1 is transmitted and the mobile station apparatus 1 has applied this configuration, the mobile station apparatus 1 flushes HARQ buffers associated with HARQ processes of the UL CC-1, and monitors only an uplink grant of the DL CC-2 without carrying out reception processing of the PHICH of the DL CC-1, and therefore, a load of reception processing of the mobile station apparatus 1 can be reduced.

(a) In order to achieve above-mentioned objects, the others embodiment of the present invention have taken the following measures. That is, a wireless communication system of other embodiment of the present invention is the wireless communication system where a mobile station apparatus and a base station apparatus communicate with each other using a plurality of downlink component carriers, and in case that a downlink component carrier receiving a HARQ indicator for uplink data which the mobile station apparatus transmitted to the base station apparatus has been deactivated, the mobile station apparatus sets ACK without receiving the HARQ indicator, and the base station apparatus judges that the mobile station apparatus has set ACK without receiving the HARQ indicator.

(b) A wireless communication system of other embodiment of the present invention is the wireless communication system where a mobile station apparatus and a base station apparatus communicate with each other using a plurality of downlink component carriers, and in case that a downlink component carrier receiving a HARQ indicator for uplink data which the mobile station apparatus transmitted to the base station apparatus is deactivated, the mobile station apparatus flushes buffers for the uplink data without receiving the HARQ indicator, and the base station apparatus judges that the mobile station apparatus has flushed buffers for the uplink data without receiving the HARQ indicator.

(c) A mobile station apparatus of other embodiment of the present invention is the mobile station apparatus which communicates with a base station apparatus using a plurality of downlink component carriers, and in case that a downlink component carrier receiving a HARQ indicator for uplink data transmitted to the base station apparatus is deactivated, the mobile station apparatus sets ACK without receiving the HARQ indicator.

(d) A mobile station apparatus of other embodiment of the present invention is the mobile station apparatus which communicates with a base station apparatus using a plurality of downlink component carriers, and in case that a downlink component carrier receiving a HARQ indicator for uplink data transmitted to the base station apparatus is deactivated, the mobile station apparatus flushes buffers for the uplink data without receiving the HARQ indicator.

(e) A base station apparatus of other embodiment of the present invention is the base station apparatus which communicates with a mobile station apparatus using a plurality of downlink component carriers, and in case that a downlink component carrier receiving a HARQ indicator for uplink data which the mobile station apparatus transmitted to the base station apparatus is deactivated, the mobile station apparatus judges that the mobile station apparatus has set ACK without receiving the HARQ indicator.

(f) A base station apparatus of other embodiment of the present invention is the base station apparatus which communicates with a mobile station apparatus using a plurality of downlink component carriers, and in case that a downlink component carrier receiving a HARQ indicator for uplink data which the mobile station apparatus transmitted to the base station apparatus is deactivated, the mobile station apparatus judges that the mobile station apparatus has flushed buffers for the uplink data without receiving the HARQ indicator.

(g) A wireless communication method of other embodiment of the present invention is the wireless communication method used for a mobile station apparatus which communicates with a base station apparatus using a plurality of downlink component carriers, and in case that a downlink component carrier receiving a HARQ indicator for uplink data transmitted to the base station apparatus is deactivated, the wireless communication method has means to set ACK without receiving the HARQ indicator.

(h) A wireless communication method of other embodiment of the present invention is the wireless communication method used for a mobile station apparatus which communicates with a base station apparatus using a plurality of downlink component carriers, and in case that a downlink component carrier receiving a HARQ indicator for uplink data transmitted to the base station apparatus is deactivated, the wireless communication method has means to flush buffers for the uplink data without receiving the HARQ indicator.

(i) A wireless communication method of other embodiment of the present invention is the wireless communication method used for a base station apparatus which communicates with a mobile station apparatus using a plurality of downlink component carriers, and in case that a downlink component carrier receiving a HARQ indicator for uplink data which the mobile station apparatus transmitted to the base station apparatus is deactivated, the wireless communication method has means to judge that the mobile station apparatus has set ACK without receiving the HARQ indicator.

(j) A wireless communication method of other embodiment of the present invention is the wireless communication method used for a base station apparatus which communicates with a mobile station apparatus using a plurality of downlink component carriers, and in case that a downlink component carrier receiving a HARQ indicator for uplink data which the mobile station apparatus transmitted to the base station apparatus is deactivated, the wireless communication method has means to judge that the mobile station apparatus has flushed buffers for the uplink data without receiving the HARQ indicator.

(k) An integrated circuit of other embodiment of the present invention is the integrated circuit used for a mobile station apparatus which communicates with a base station apparatus using a plurality of downlink component carriers, and in case that a downlink component carrier receiving a HARQ indicator for uplink data transmitted to the base station apparatus is deactivated, the integrated circuit has means to set ACK without receiving the HARQ indicator.

(l) An integrated circuit of other embodiment of the present invention is the integrated circuit used for a mobile station apparatus which communicates with a base station apparatus using a plurality of downlink component carriers, and in case that a downlink component carrier receiving a HARQ indicator for uplink data transmitted to the base station apparatus is deactivated, the integrated circuit has means to flush buffers for the uplink data without receiving the HARQ indicator.

(m) An integrated circuit of other embodiment of the present invention is the integrated circuit used for a mobile station apparatus which communicates with a base station apparatus using a plurality of downlink component carriers, and in case that a downlink component carrier receiving a HARQ indicator for uplink data which the mobile station apparatus transmitted to the base station apparatus is deactivated, the integrated circuit has means to judge that the mobile station apparatus has set ACK without receiving the HARQ indicator.

(n) An integrated circuit of other embodiment of the present invention is the integrated circuit used for a mobile station apparatus which communicates with a base station apparatus using a plurality of downlink component carriers, and in case that a downlink component carrier receiving a HARQ indicator for uplink data which the mobile station apparatus transmitted to the base station apparatus is deactivated, the integrated circuit has means to judge that the mobile station apparatus has flushed buffers for the uplink data without receiving the HARQ indicator.

A program which operates in the base station apparatus 3 and the mobile station apparatus 1 according to the present invention may be the program (program which makes a computer function) which controls a CPU (Central Processing Unit) or the like so as to realize a function of the above-mentioned embodiment according to the present invention. Then, information handled by these apparatuses is stored in a RAM (Random Access Memory) temporarily at the time of processing thereof, and after that, is stored in various ROMs such as a Flash ROM (Read Only Memory), and HDD (Hard Disk Drive), and as necessary, read-out, correction and writing are performed by a CPU.

A part of the mobile station apparatus 1 and base station apparatus 3 in above-mentioned embodiments may be realized by a computer. In that case, it may be realized by that a program for realizing this control function is recorded in a computer-readable recording medium, and the program recorded on the recording medium is read into a computer system and be executed. A "computer system" mentioned here is a computer system which is built-in in the mobile station apparatus 1 or the base station apparatus 3, and OS and hardware such as a peripheral device shall be included.

A "computer-readable recording medium" refers to portable media, such as a flexible disk, a magnetic-optical disk, a ROM, and a CD-ROM, and a storage device, such as a hard disk built-in in a computer system. In addition, a "computer-readable recording medium" may also include one which holds a program in a short time and dynamically like a communication line when transmitting a program via a network such as Internet and a communication line such as a telephone line, and one which holds a program in certain period of time like a volatile memory inside a computer system which will be a server and client in that case. The above-mentioned program may be one for realizing a part of function mentioned above, and in addition, may be one which can realize an above-mentioned function in combination with a program already recorded in a computer system.

In addition, a part or all of the mobile station apparatus 1 and base station apparatus 3 in above-mentioned embodiments may be made to be realized as a LSI which is an integrated circuit typically. Each functional block of the mobile station apparatus 1 and base station apparatus 3 may be made in a chip individually, and a part or all may be integrated in a chip. A circuit-integrating method may be realized as a dedicated circuit or a general-purpose processor without limiting to a LSI. When a circuit-integrating technology in place of a LSI comes into existence owing to a progress of a semiconductor technology, it is also possible to use an integrated circuit according to this technology.

Hereinabove, an embodiment of this invention has been described in detail with reference to drawings, and a specific configuration is not limited to one mentioned above, and it is possible to carry out various design modifications or the like without departing from substance of this invention.

DESCRIPTION OF SYMBOLS

1 (1A, 1B, 1C) Mobile station apparatus
3 Base station apparatus
101 Higher layer processing section
103 Control section
105 Reception section
107 Transmission section
301 Higher layer processing section
303 Control section
305 Reception section
307 Transmission section
1011 Radio resource control part
1013 HARQ control part
1015 HARQ storage part
3011 Radio resource control part
3013 HARQ control part
3015 HARQ storage part

The invention claimed is:

1. A wireless communication method used for a mobile station apparatus configured to communicate with a base station apparatus using a plurality of downlink component carriers and a plurality of uplink component carriers, the wireless communication method comprising:
   receiving a first command indicating deactivating a first downlink component carrier;
   deactivating the first downlink component carrier in response to the first command;
   in response to the first command, flushing HARQ buffers of only a first uplink component carrier of the plurality of uplink component carriers, the first uplink component carrier being associated with the first downlink component carrier deactivated; and
   in a case that the first command is received after a first uplink grant indicating transmission or retransmission of a physical uplink shared channel (PUSCH) on the first uplink component carrier is received on the first downlink component carrier, and the mobile station apparatus is notified, before the transmission or the retransmission of the PUSCH is performed, from the base station apparatus by the first command not to use the first downlink component carrier for downlink communication, flushing the HARQ buffers after performing the transmission or the retransmission of the PUSCH.

2. The wireless communication method according to claim 1, wherein the first downlink component carrier is different from a downlink primary component carrier, and
   the first uplink component carrier is different from an uplink primary component carrier.

3. The wireless communication method according to claim 1, further comprising:
   before receiving the first command, receiving on the first downlink component carrier a second command for the base station apparatus to configure the mobile station apparatus with a second downlink component carrier of the plurality of downlink component carriers, the second downlink component carrier being used for the base station apparatus to transmit to the mobile station apparatus, a first uplink grant associated with the first uplink component carrier; and flushing the HARQ buffers in a case that the first downlink component carrier is deactivated.

4. A mobile station apparatus configured to communicate with a base station apparatus using a plurality of downlink component carriers and a plurality of uplink component carriers, the mobile station apparatus comprising:
   receiving circuitry configured to and/or programmed to receive a first command indicating deactivating a first downlink component carrier of the plurality of downlink component carriers;
   control circuitry configured to and/or programmed to deactivate the first downlink component carrier in response to the first command; and
   HARQ control circuitry configured to and/or programmed to, in response to the first command, flush HARQ buffers of only a first uplink component carrier of the plurality of uplink component carriers, the first uplink component carrier being associated with the first downlink component carrier deactivated, wherein
   the HARQ control circuitry is configured to and/or programmed to, in a case that the first command is received after a first uplink grant indicating transmission or retransmission of a physical uplink shared channel (PUSCH) on the first uplink component carrier is received on the first downlink component carrier, and the mobile station apparatus is notified, before the transmission or the retransmission of the PUSCH is performed, from the base station apparatus by the first command not to use the first downlink component carrier for downlink communication, flush the HARQ buffers after the transmission or the retransmission of the PUSCH is performed.

5. The mobile station apparatus according to claim 4, wherein the first downlink component carrier is different from a downlink primary component carrier, and the first uplink component carrier is different from an uplink primary component carrier.

6. The mobile station apparatus according to claim 4, wherein the receiving circuitry is configured to and/or programmed to, before the first command is received, receive on the first downlink component carrier, a second command for the base station apparatus to configure the mobile station apparatus with a second downlink component carrier of the plurality of downlink component carriers, the second downlink component carrier being used for the base station apparatus to transmit to the mobile station apparatus, a first uplink grant associated with the first uplink component carrier, and the HARQ control circuitry is configured to and/or programmed to flush the HARQ buffers in a case that the first downlink component carrier is deactivated.

7. An integrated circuit mountable on a mobile station apparatus configured to communicate with a base station apparatus using a plurality of downlink component carriers and a plurality of uplink component carriers, the integrated circuit comprising:

receiving circuitry configured to and/or programmed to receive a first command indicating deactivating a first downlink component carrier of the plurality of downlink component carriers, control circuitry configured to and/or programmed to deactivate the first downlink component carrier in response to the first command; and HARQ control circuitry configured to and/or programmed to, in response to the first command flush HARQ buffers of only a first uplink component carrier of the plurality of uplink component carriers, the first uplink component carrier being associated with the first downlink component carrier deactivated, wherein the HARQ control circuitry is configured to and/or programmed to, in a case that the first command is received after a first uplink grant indicating transmission or retransmission of a physical uplink shared channel (PUSCH) on the first uplink component carrier is received on the first downlink component carrier, and the mobile station apparatus is notified, before the transmission or the retransmission of the PUSCH is performed, from the base station apparatus by the first command not to use the first downlink component carrier for downlink communication, flush the HARQ buffers after the transmission or the retransmission of the PUSCH is performed.

8. The integrated circuit according to claim 7, wherein the first downlink component carrier is different from a downlink primary component carrier, and the first uplink component carrier is different from an uplink primary component carrier.

9. The integrated circuit according to claim 7, wherein the receiving circuitry is configured to and/or programmed to, before the first command is received, receive on the first downlink component carrier, a second command for the base station apparatus to configure the mobile station apparatus with a second downlink component carrier of the plurality of downlink component carriers, the second downlink component carrier being used for the base station apparatus to transmit to the mobile station apparatus, a first uplink grant associated with the first uplink component carrier, and the HARQ control circuitry is configured to and/or programmed to flush the HARQ buffers in a case that the first downlink component carrier is deactivated.

* * * * *